(12) United States Patent
Ravi et al.

(10) Patent No.: US 12,067,637 B1
(45) Date of Patent: Aug. 20, 2024

(54) GRADATED SERVICE ACCESS BASED ON IDENTITY VERIFICATION (IDV)

(71) Applicant: Block, Inc., San Francisco, CA (US)

(72) Inventors: Bhavishyavani Ravi, San Francisco, CA (US); Ted Wong, San Francisco, CA (US); Shannon-Lee Eng, San Jose, CA (US); Aditya Nagpal, San Francisco, CA (US)

(73) Assignee: Block, Inc., Oakland, CA (US)

( * ) Notice: Subject to any disclaimer, the term of this patent is extended or adjusted under 35 U.S.C. 154(b) by 896 days.

(21) Appl. No.: 16/370,635

(22) Filed: Mar. 29, 2019

(51) Int. Cl.
*G06Q 50/26* (2024.01)
*G06N 20/00* (2019.01)

(52) U.S. Cl.
CPC ........... *G06Q 50/265* (2013.01); *G06N 20/00* (2019.01)

(58) Field of Classification Search
CPC .............................. G06Q 50/265; G06N 20/00
USPC ......................................................... 705/325
See application file for complete search history.

(56) References Cited

U.S. PATENT DOCUMENTS

| | | | |
|---|---|---|---|
| 8,893,293 B1 | 11/2014 | Schmoyer et al. | |
| 9,406,067 B1* | 8/2016 | Robinson | G06Q 20/4016 |
| 10,049,359 B2* | 8/2018 | Lyda | G06Q 20/4014 |
| 10,452,897 B1* | 10/2019 | Benkreira | G06V 30/413 |
| 10,693,872 B1* | 6/2020 | Larson | H04L 63/0478 |
| 11,250,429 B1 | 2/2022 | Ravi et al. | |
| 2006/0235796 A1 | 10/2006 | Johnson et al. | |
| 2008/0103972 A1 | 5/2008 | Lanc | |
| 2008/0208701 A1 | 8/2008 | Betancourt et al. | |
| 2009/0187492 A1 | 7/2009 | Hammad et al. | |
| 2012/0303531 A1 | 11/2012 | Betancourt | |
| 2014/0222690 A1 | 8/2014 | Wilf et al. | |
| 2015/0059003 A1* | 2/2015 | Bouse | G06F 21/32 |
| | | | 726/28 |
| 2015/0235208 A1 | 8/2015 | Murphy et al. | |
| 2015/0235221 A1 | 8/2015 | Murphy, Jr. et al. | |
| 2018/0165759 A1* | 6/2018 | Carrington | G06Q 20/36 |
| 2019/0028492 A1* | 1/2019 | Coleman | G06K 9/6228 |
| 2019/0295074 A1 | 9/2019 | Carrott | |
| 2019/0385160 A1 | 12/2019 | Safak et al. | |

(Continued)

OTHER PUBLICATIONS

Experian, "Identity proofing insights and best practices", Jan. 2017, https://www.experian.com/assets/government/white-papers/identity-proofing.pdf (Year: 2017).*

(Continued)

*Primary Examiner* — Lynda Jasmin
*Assistant Examiner* — Joshua D Schneider
(74) *Attorney, Agent, or Firm* — Lee & Hayes P.C.

(57) ABSTRACT

Gradated access to services based on identity verification (IDV) is described herein. In an example, a computing device can receive identifying information of a user and can select, from a plurality of IDV paths and based at least in part on the identifying information of the user, an IDV path for verifying an identity of the user using one or more factors. Based at least in part on the one or more factors, the computing device can determine a score indicative of whether the identifying information provided by the user accurately identifies the user. The score can be used for the benefit of one or more service providers to verify an identity of the user and/or determine gradated access to one or more services of the one or more service providers.

20 Claims, 13 Drawing Sheets

(56) References Cited

U.S. PATENT DOCUMENTS

| | | |
|---|---|---|
| 2020/0234297 A1 | 7/2020 | Murray et al. |
| 2020/0265458 A1 | 8/2020 | Esecson |
| 2020/0302309 A1* | 9/2020 | Golding ................... G06N 5/04 |
| 2020/0320503 A1 | 10/2020 | Mell |

OTHER PUBLICATIONS

Information Technology Laboratory, NIST, "Measuring Strength of Identity Proofing", Workshop: Applying Measurement Science to the Identity Ecosystem Version: 1, Dec. 16, 2015 (Year: 2015).*

U.S. Department of Commerce, "Digital Identity Guidelines Enrollment and Identity Proofing", Jun. 2017, NIST Special Publication 800-63A, https://nvlpubs.nist.gov/nistpubs/SpecialPublications/NIST.SP.800-63a.pdf (Year: 2017).*

Preinterview First Office Action mailed Feb. 1, 2021, for U.S. Appl. No. 16/370,714, of Ravi, B., et al., filed Mar. 29, 2019.

First Action Interview Office Action Summary mailed Jul. 21, 2021, for U.S. Appl. No. 16/370,714, of Ravi, B., et al., filed Mar. 29, 2019.

Notice of Allowance mailed Oct. 5, 2021, for U.S. Appl. No. 16/370,714, of Ravi, B., et al., filed Mar. 29, 2019.

* cited by examiner

US 12,067,637 B1

GRADATED SERVICE ACCESS BASED ON IDENTITY VERIFICATION (IDV)

BACKGROUND

Banks, brokerage firms, financial institutions, and/or other entities that participate in financial actions are subject to various laws, rules, and regulations. To ensure compliance with such laws, rules, and regulations, banks, brokerage firms, financial institutions, and/or other entities that participate in financial actions utilize compliance departments to review actions and ensure compliance with all applicable laws, rules, and regulations.

One aspect of compliance requires that banks, brokerage firms, financial institutions, and/or other entities that participate in financial actions know their customers. That is, banks, brokerage firms, financial institutions, and/or other entities that participate in financial actions are expected to verify the identity of customers seeking to use or using their services. Identity verification requires a customer (or potential customer) to provide information that is used by compliance departments to prove that the information is associated with an identity of a real person or entity.

Data breaches have become a common occurrence. As a result, personally identifying information (PII) is increasingly available via the Internet. The ability of fraudsters to easily access PII significantly undermines the ability of banks, brokerage firms, financial institutions, and/or other entities that participate in financial actions to verify the identity of their customers. That is, with the PII that is publicly available, traditional identity verification technologies are inadequate for verifying identities.

Furthermore, in some cases, customers may not have enough PII to verify their identity. For instance, underserved populations, including, but not limited to, immigrants, asylees, minors, etc. may not have enough PII to verify their identity. As a result, such populations are often denied access to services of banks, brokerage firms, financial institutions, and/or other entities that participate in financial actions due to the inability to verify their identity.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
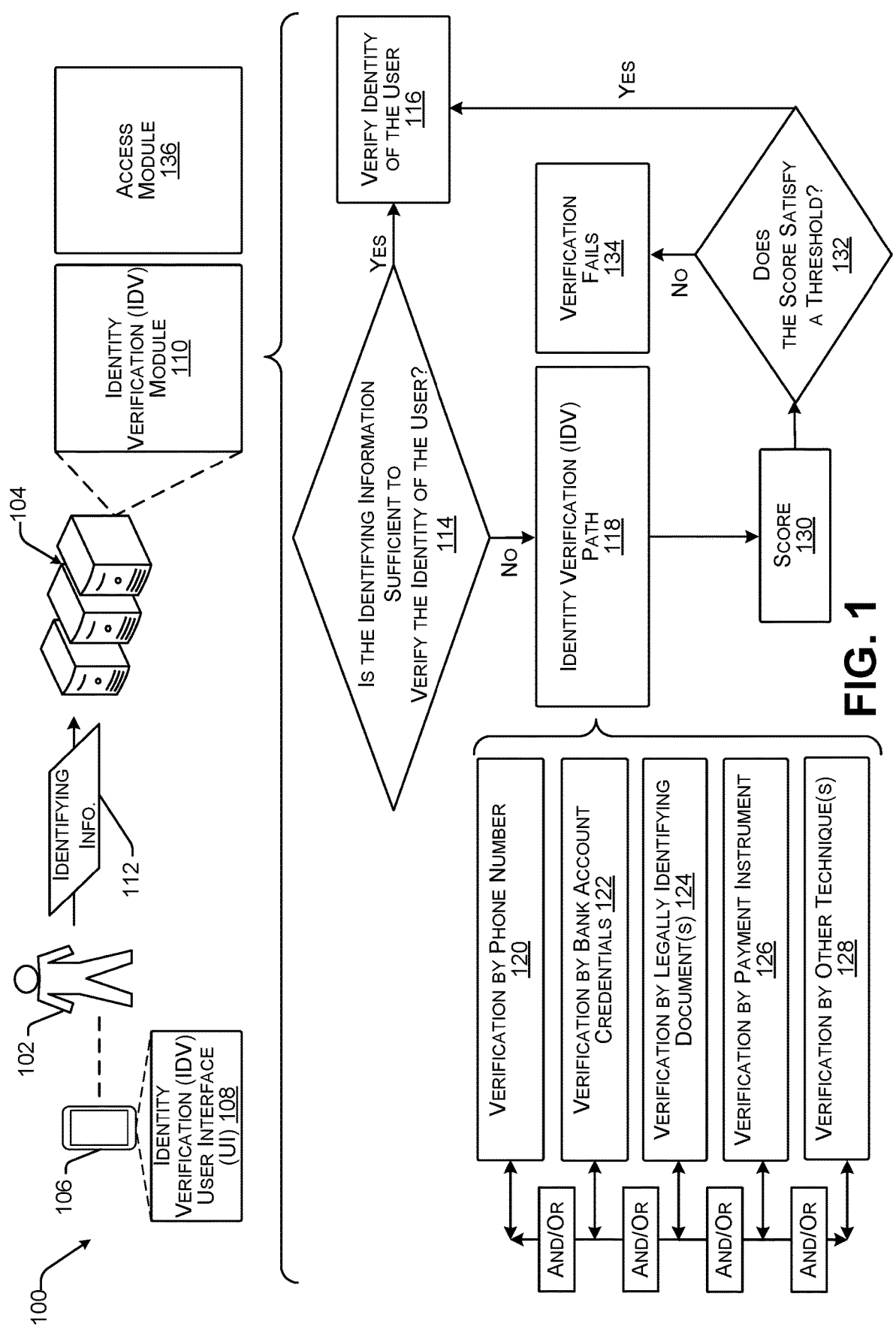
FIG. 1 illustrates an example environment for, among other things, verifying an identity of a user, as described herein.

Techniques described herein are directed to unconventional identity verification (IDV) systems, processes, and the like to enable service providers (e.g., banks, brokerage firms, financial institutions, etc.) to verify the identity of their customers (or potential customers) for, for example, providing gradated access to their services. For instance, an IDV system operating for the benefit of multiple service providers is described. The IDV system can utilize IDV paths, which can be multi-dimensional processes using one or more factors such as verification by phone number, verification by bank account credentials, verification by legally identifying documents, verification by payment card information, and the like. Each of the factors can relate to different aspects of a customer's (or potential customer's) identity. The IDV system can perform a discrete IDV check on a particular factor for any service offered by a service provider, and different services can have different gradated paths. Various combinations of the factors can be used to generate a score which can be representative of (i) whether identifying information provided by a customer (or potential customer) accurately identifies the customer (or potential customer) (i.e., Is the customer who they say they are?) and/or (ii) a confidence value indicating how confident the IDV system is that the customer (or potential customer) is accurately identified.

In at least one example, the score can be used for making IDV decisions, such as verifying an identity of a customer (or potential customer) and/or determining gradated access to services. For the purpose of this discussion, services can be "gradated" in that different services can be provided to different customers and/or groups of customers based on scores output from the IDV paths. That is, techniques described herein can differentiate (i) types of services, (ii)

levels of services, (iii) terms associated with services, and so on based on scores output from the IDV paths.

Take for example, a first customer associated with a first score below a threshold or in a first range of scores and a second customer associated with a second score above a threshold or in a second range of scores. In an example, the second customer may be able to access services that are not available to the first customer. For instance, the first customer may be able to utilize a payment processing service provided by a service provider and the second customer may be able to utilize the payment processing service and access capital financing from the service provider. That is, the services available to the customers can be gradated based on the first score and the second score.

Additionally or alternatively, the first customer and the second customer may be able to access the same service, but the first customer may have restrictions imposed thereon that are not imposed on the second customer. Or, said another way, the second customer can access more features than the first customer and/or can receive a different level of service than the first customer. For instance, the first customer may be able to receive funds generated from utilizing a payment processing service on a daily basis (e.g., funds are transferred from an account managed by the service provider to a bank account of the first customer) whereas the second customer may be able to receive said funds via instant deposit or same day deposit, in addition to the daily deposit that is available to the first customer. In such an example, the first customer cannot receive same day or instant deposits. That is, the level of service can be gradated based on the first score and the second score.

Further, the first customer and the second customer may be able to access the same service, but the first customer may have different terms associated with accessing the service. For example, the first customer may be able to utilize a payment processing service for a higher fee per transaction than the fee per transaction charged to the second customer. That is, the terms associated with the service can be gradated based on the first score and the second score.

As described above, the IDV paths can be multi-dimensional processes using one or more factors such as verification by phone number, verification by bank account credentials, verification by legally identifying documents, verification by payment card information, and the like. In at least one example, techniques described herein can leverage an environment of distributed merchants to verify identities of customers, for instance, using payment card information (individually or in addition to using one or more other factors). For example, during an IDV process, a customer (or potential customer) can provide payment information associated with a payment instrument to the IDV system. In some examples, the IDV system can prompt the customer (or potential customer) to visit a brick-and-mortar store of merchant (i.e., physically visit the merchant). That is, the IDV system can instruct the customer (or potential customer) to interact with a merchant and, based on such an interaction, the IDV system can verify the identity of the customer (or potential customer) and/or determine gradated services for the customer (or potential customer).

In some examples, the merchant can launch an IDV process via a point-of-sale (POS) application that transmits verification information to the IDV system. For example, a customer can visit a brick-and-mortar location of a merchant and tell, or otherwise communicate to, the merchant that he or she is there to verify their identity. The merchant can launch an IDV process via a POS application stored on a merchant device of the merchant. Using the POS application, the merchant can confirm that the customer is physically present, can prompt the customer to insert his or her payment instrument into a payment reader associated with the merchant device (or otherwise cause an interaction between the payment instrument and the payment reader), ask the customer personal questions associated with the customer (e.g., which can be provided to the merchant from the IDV system, etc.), etc. Such interactions between the merchant and the customer can be used by the IDV system to verify the identity of the customer and/or determine gradated services for the customer (or potential customer).

In additional or alternative examples, the merchant may not know that the customer (or potential customer) is visiting the merchant for verification purposes and the customer (or potential customer) can participate in a transaction. Transaction data associated with the transaction can be used by the IDV system to verify the identity of the customer (or potential customer). That is, transaction data evidencing that the customer (or potential customer) physically visited one of the merchants can be used by the IDV system to verify the identity of the customer (or potential customer) and/or determine gradated services for the customer (or potential customer).

Payment information associated with a payment instrument can be used for additional or alternative verification purposes as well. For instance, the IDV system can access payment history associated with the payment information and can correlate the payment history with other identifying information (e.g., as provided by the customer (or potential customer)). For example, the IDV system can compare retrieved payment history with an address provided by the customer to verify the address, and thus the identity of the customer (or potential customer). In some examples, such a comparison can be useful in determining gradated services for the customer (or potential customer). Further, the IDV system can prompt the customer (or potential customer) to answer questions based on the payment history (e.g., via a device of the customer or at the merchant). In such an example, the IDV system can compare answers to the questions (e.g., by the customer (or potential customer)) to the payment history to verify the identity of the customer (or potential customer) and/or determine gradated services for the customer (or potential customer). In some examples, the payment information can be used to perform a card-not-present (CNP) transaction. If the CNP transaction is completed (e.g., thereby representing that the payment information provided is valid), the IDV system can verify the identity of the customer and/or determine gradated services for the customer (or potential customer).

As mentioned above, one or more factors can be utilized to determine a score for a customer (or potential customer). Individually, each factor can be associated with a score which can be representative of (i) whether identifying information provided by a customer (or potential customer) accurately identifies the customer (or potential customer) (i.e., Is the customer who they say they are?) and/or (ii) a confidence value indicating how confident the IDV system is that the customer (or potential customer) is accurately identified. Further, one or more scores can be combined to generate an aggregated score which can be representative of (i) whether identifying information provided by a customer (or potential customer) accurately identifies the customer (or potential customer) (i.e., Is the customer who they say they are?) and/or (ii) a confidence value indicating how confident the IDV system is that the customer (or potential customer) is accurately identified. As described above, the score (individually or aggregated) can be used to verify an identity of the customer (or potential customer) and/or to determine gradated access to one or more services.

Techniques described herein are directed to systems, processes, and the like for dynamically and progressively utilizing verification factors that rely upon data that is accessible to a general population of customers (or potential customers) to verify identities. Due to data breaches and other data compromises, personally identifying information (PII) is available via the Internet. Accordingly, fraudsters can access PII and use such PII for fraudulently verifying identities. As a result, unauthorized customers (or potential customers) are often able to access services of banks, brokerage firms, financial institutions, and/or other entities that participate in financial actions fraudulently (or maliciously).

Techniques described herein offer increased security in IDV techniques. Alternate data sets, that extend beyond what is conventionally used for IDV, can be used to enhance IDV techniques. Furthermore, techniques described herein directed to IDV via a (physical) interaction with a merchant at a point-of-sale (POS) of the merchant can reduce fraud that is associated with IDV. That is, by using the multi-faceted, multi-dimensional IDV techniques described herein, banks, brokerage firms, financial institutions, and/or other entities that participate in IDV can more reliably verify the identity of customers (or potential customers). As such, techniques described herein are directed to improvements to existing IDV technologies. Moreover, banks, brokerage firms, financial institutions, and/or other entities that participate in IDV can gradate access to services using IDV techniques described herein.

Further, some customers may not have enough PII to verify their identity. For instance, underserved populations, including, but not limited to, immigrants, asylees, minors, etc. may not have enough PII to verify their identity. As a result, such populations are often denied access to services of banks, brokerage firms, financial institutions, and/or other entities that participate in IDV due to the inability to verify their identity. Techniques described herein utilize factors that are accessible to underserved populations such that customers (or potential customers) that would not be able to access services using existing IDV technologies are able to access services using the IDV techniques described herein. That is, techniques described herein utilize alternative data sets (e.g., versus PII used for conventional IDV processes) to enhance access to services. As such, techniques described herein are directed to improved IDV technologies.

FIG. 1 illustrates an example environment 100 for, among other things, verifying an identity of a user, as described herein.

Environment 100 includes a user 102 and server computing device(s) 104, which can be associated with a service provider. In at least one example, the service provider associated with the server computing device(s) 104 can provide one or more services, which can include, but are not limited to, a payment processing service, an ecommerce service, a website development service, a marketplace service, an inventory management service, an order management service, a delivery service, a payroll service, an appointments service, a peer-to-peer payment service, a consumer financing service, a capital financing service, an IDV service, and so on.

The user 102 can be any entity that requests to access services of the service provider and/or an entity that utilizes services of the service provider. In some examples, the user 102 can be referred to as a customer, a consumer, a potential customer, a potential consumer, or any other entity that desires to use, or uses, services of the service provider(s). In at least one example, the user 102 can be a "merchant" in the sense that the user 102 may offer goods and/or services ("items") for sale via a platform provided via the service provider.

In at least one example, the user 102 can operate a device 106 which can be any suitable type of computing device, e.g., portable, semi-portable, semi-stationary, or stationary. Some examples of the device 106 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In at least one example, the device 106 can present an IDV user interface (UI) 108 to enable the user 102 to interact with the server computing device(s) 104 to verify its identity. In an example, the UI can be presented via a web browser, or the like. In other examples, the UI can be presented via an application, such as a mobile application or desktop application, which is provided by the service provider, or which can be an otherwise dedicated application. In at least one example, the IDV UI 108 can transmit data to and/or exchange data with the server computing device(s) 104 via one or more networks.

The server computing device(s) 104 can be associated with one or more functional components, as described below. In at least one example, these functional components comprise instructions or programs that are executable by processor(s) of the server computing device(s) 104 that, when executed, implement operational logic for performing the actions and services attributed above to the server computing device(s) 104. In at least one example, one of the functional components can be an IDV module 110. The IDV module 110 can analyze data and perform other operations for verifying identities of users, such as the user 102.

In at least one example, the user 102 can provide identifying information 112 to the server computing device(s) 104, for example via the IDV UI 108. In some examples, the identifying information 112 can be PII. PII is any information relating to an identifiable person which can include, but is not limited to, name, social security number, date and place of birth, addresses, biometric records, and so on. The identifying information 112 can additionally or alternatively include other information (that may or may not be PII) that can be used to identify the user 102. In some examples, if the user 102 is a merchant, the identifying information 112 can be associated with information that can be used to identify the merchant (e.g., business name, tax identification number (e.g., an Employer Identification Number (EIN), etc.).

The IDV module 110 can receive the identifying information 112 and can determine whether the identifying information is sufficient to verify the identity of the user 102, as is shown in block 114. That is, the IDV module 110 can analyze the identifying information 112 and determine whether the identifying information 112 corresponds to an identifiable entity (e.g., person, merchant, etc.). Based at least in part on the IDV module 110 determining that the identifying information 112 corresponds to an identifiable entity (e.g., person, merchant, etc.), and in some examples, with a level of certainty that satisfies a threshold, the IDV module 110 can verify the identity of the user 102, as illustrated in block 116.

In some examples, the IDV module 110 can determine that the identifying information 112 does not correspond to an identifiable entity (e.g., person, merchant, etc.). Alternatively, the IDV module 110 can determine that the identifying information 112 corresponds to an identifiable entity, but a level of uncertainty associated with the determination can be such that the IDV module 110 can determine that the identifying information 112 is insufficient to verify the identity of the user 102 (e.g., the level of certainty does not satisfy a threshold). For example, the identifying information 112 provided is thin (e.g., below a threshold amount), the identifying information 112 provided indicates that the user 102 may be part of a high-risk classification (e.g., based on age, geographic location, etc.), and so on. Accordingly, to provide more certainty with respect to IDV, additional information—which can be acquired via IDV techniques described herein—may be desirable. In either example, the IDV module 110 can initiate an IDV path, as illustrated in block 118.

In at least one example, the IDV module 110 can utilize a plurality of IDV paths for verifying identities of users. Each of the IDV paths can be multi-dimensional processes using one or more factors to determine a score (or other indicator) representative of (i) whether identifying information provided by a user accurately identifies the user and/or (ii) a confidence value indicating how confident the IDV system is that the customer (or potential customer) is accurately identified. In some examples, instructions for implementing individual IDV paths can be stored in association with the server computing device(s) 104. In other examples, instructions for implementing individual IDV paths can be generated responsive to determining that identifying information provided by a user is insufficient to verify the identity of the user. That is, in additional or alternative examples, instructions for implementing individual IDV paths can be generated in near-real-time. As described below, the factor(s) and order of presenting/performing the factor(s) (e.g., the sequence in which the factor(s) are presented) can be determined using a machine-trained model. That is, the IDV module 110 can utilize a machine-trained model to determine which IDV path to implemented for verifying the identity of the user 102. In some examples, the selected IDV path can be selected based on characteristics of the user(s) 102, service(s) for which access is requested, context associated with request(s) to access service(s), etc.

An IDV path can comprise one or more factors, which can include but are not limited to, verification by phone number (factor 120), verification by bank account credentials (factor 122), verification by legally identifying documents (factor 124), verification by payment card information (factor 126), and verification by other technique(s) (factor(s) 128). Each of the factors can relate to different aspects of a user's identity. An IDV path can use any of these factors, individually or in combination, in any order. In at least one example, factors of an IDV path can be performed in a particular order, or sequence, as determined by the IDV module 110. The order of factors presented in FIG. 1 is not limiting, and any factor can be used alone or in combination to verify the identity of the user 102. As described above, each factor of an IDV path can be performed serially (e.g., one after another), in parallel (e.g., at the same time or substantially same time), etc.

Verification by phone number (the factor 120) represents process(es) for verifying the identity of the user 102 based on a phone number provided by the user 102. In at least one example, the IDV module 110 can prompt the user 102 to provide a telephone number (also referred to as a "phone number") or other identifier associated with a mobile device of the user 102. The user 102 can input the telephone number via the IDV UI 108. In at least one example, responsive to receiving the telephone number, the IDV module 110 can send a text message (or other communication) to a device 106 of the user 102. The text message (or other communication) can request the user 102 reply to the text message, and in some examples can include a code for providing via a subsequent response. Based on receiving the reply message (or not) and/or otherwise provisioning the code back to the IDV module 110 (e.g., via the IDV UI 108), the IDV module 110 can determine a score associated with the factor 120.

In an additional or alternative example, responsive to receiving the telephone number, the IDV module 110 can send an information request to one or more telecommunications service providers (e.g., computing device(s) associated therewith). The information request can include the telephone number (and, in some examples, additional data identifying the user 102). In some examples, the IDV module 110 can send the request to an application programming interface (API) associated with telecommunications service provider that enables the IDV module 110 to request and/or receive information associated with users who subscribe to services of the telecommunications service provider.

In at least one example, the telecommunications service provider can return an indication of whether the telephone number is associated with an account of the telecommunications service provider. The IDV module 110 can determine a score associated with the factor 120 based on receiving an indication that the telephone number is associated with an account of the telecommunications service provider. In at least one example, the IDV module 110 can send a text message (or other communication) to the device 106 of the user 102 responsive to receiving the response from the telecommunications service provider. The text message (or other communication) can request the user 102 reply to the text message, and in some examples can include a code for providing via a subsequent response. Based on receiving the reply message (or not) and/or otherwise provisioning the code back to the IDV module 110 (e.g., via the IDV UI 108), the IDV module 110 can determine a score associated with the factor 120. That is, in such an example, techniques described herein can utilize a two-factor verification process for IDV of the user 102. The IDV module 110 can determine a score associated with the factor 120 based on a receiving a response via the two-factor verification.

In some examples, the telecommunications service provider can return additional information associated with an identified account. For instance, the telecommunications service provider can return a name, address, date of birth, etc. associated with the account. In such an example, the IDV module 110 can verify the identity of the user 102 based at least in part on the response from the telecommunications service provider. In at least one example, the IDV module 110 can compare the information received from the telecommunications service provider to the identifying information 112 received from the user 102. The IDV module 110 can determine a score associated with the factor 120 based on a similarity between the information received from the telecommunications service provider and the identifying information 112 received from the user 102.

Verification by bank account (the factor 122) represents process(es) for verifying the identity of the user 102 based on bank account credentials provided by the user 102. In at least one example, the IDV module 110 can prompt the user 102 to provide information associated with one or more of their bank accounts. Such information can include a name of a bank (or other financial institution) maintaining the account for the user 102, an account number associated with the account, etc. In at least one example, the user 102 can provide such information via the IDV UI 108.

In at least one example, responsive to receiving the bank account information, the IDV module 110 can send a request to access information associated with the bank account of the user 102 to the appropriate bank (or other financial institution). In some examples, the IDV module 110 can transmit and/or exchange data with the bank (or other financial institution) via an API provided via the bank (or other financial institution). Responsive to sending the request, the IDV module 110 can receive information associated with the bank account of the user 102. That is, the bank (or other financial institution) can send information associated with the bank account of the user 102 to the IDV module 110 (with permission of the user 102). In at least one example, such information can include a name of the account holder, an address of the account holder, a date of birth of the account holder, a contact number associated with the account holder, transactions associated with the account, etc.

In an additional or alternative example, the IDV module 110 can send a request to access information associated with the bank account of the user 102 to a third-party service provider that manages personal finances on behalf of users (e.g., PLAID®, MONEYDANCE®, BANKTIVITY®, etc.). In some examples, the IDV module 110 can transmit and/or exchange data with the third-party service provider via an API provided via the third-party service provider. Responsive to sending the request, the IDV module 110 can receive information associated with the bank account of the user 102. That is, the third-party service provider can send information associated with the bank account of the user 102 to the IDV module 110 (with permission of the user 102). In at least one example, such information can include a name of the account holder, an address of the account holder, a date of birth of the account holder, a contact number associated with the account holder, transactions associated with the account, etc.

In at least one example, the IDV module 110 can determine a score for the factor 122 based at least in part on the information received from the bank (or other financial institution) and/or the third-party service provider. For example, the IDV module 110 can compare the information received from the bank (or other financial institution) and/or the third-party service provider with the identifying information 112 received from the user 102 to determine a score for the factor 122. Additionally or alternatively, the IDV module 110 can determine questions based on the information received from the bank (or other financial institution) and/or the third-party service provider. Such questions can be directed to transaction history associated with the bank account (e.g., merchants from whom an account holder has transacted, dates associated with such transactions, amounts of such transactions, etc.). The IDV module 110 can send one or more of the questions to the device 106 of the user 102 and/or a device operable by a merchant (as described below with reference to FIG. 5). The user 102 can answer the question(s) (e.g., via the IDV UI 108) and the IDV module 110 can utilize the answer(s) to the question(s) to determine a score for the factor 122. That is, in some examples, the IDV module 110 can utilize knowledge-based authentication for determining a score for the factor 122.

While the factor 122 is directed to verification by bank account credentials, the same or similar techniques described can be applicable to any other financial account of the user 102.

Verification by legally identifying document(s) (the factor 124) represents process(es) for verifying the identity of the user 102 based on legally identifying document(s) provided by the user 102. In at least one example, the IDV module 110 can prompt the user 102 to scan and provide an electronic copy of a legally identifying document (e.g., driver's license, passport, identification card, etc.) to the IDV module 110. Additionally or alternatively, the IDV module 110 can prompt the user 102 to provide information associated with one or more of their legally identifying documents. Such information can include a number associated with a legally identifying document (e.g., driver license number, passport number, etc.). In at least one example, the user 102 can provide such information via the IDV UI 108. Based at least in part on receiving the legally identifying document(s) and/or information associated therewith, the IDV module 110 can determine a score associated with the factor 124. In some examples, if the user 102 provides information associated with a legally identifying document instead of the legally identifying document itself, the IDV module 110 can perform a lookup or otherwise verify the information provided corresponds to the legally identifying documents of the user 102.

Verification by payment instrument (the factor 126) represents process(es) for verifying the identity of the user 102 based on payment information associated with a payment instrument of the user 102. In at least one example, the IDV module 110 can prompt the user 102 to provide payment information associated with a payment instrument of the user 102. Such payment information can include a number associated with a payment instrument, a verification value (e.g., PIN Verification Key Indicator ("PVKI"), PIN Verification Value ("PVV"), Card Verification Value ("CVV"), Card Verification Code ("CVC"), etc.) associated with the payment instrument, an expiration date associated with the payment instrument, etc. In at least one example, the user 102 can provide such information via the IDV UI 108.

In at least one example, the IDV module 110 can instruct the user 102 to interact with a merchant and, based on such an interaction, the IDV module 110 can verify the identity of the user 102. In at least one example, the merchant may be a trusted merchant. For the purpose of this discussion, a trusted merchant is a merchant that has been shown to be reliable. For example, the service provider can access user profiles associated with individual merchants to review transaction histories, processing volumes (e.g., of payment processed), lengths of relationships with the service provider, previous complaints concerning merchants, inquiries regarding fraudulent behavior, and so on to determine whether individual merchants are reliable and thus trusted. In at least one example, the IDV module 110 can send a list comprising one or more merchants to the device 106 of the user 102. The list can be presented via the IDV UI 108. The user 102 can then interact with one or more of the merchants on the list to verify their identity in association with the factor 126.

In at least one example, the user 102 can visit a brick-and-mortar location of a merchant and tell, or otherwise communicate to, the merchant that he or she is there to verify their identity. The merchant can launch an IDV process via a POS application that transmits verification information to the IDV module 110. Using the POS application, the merchant can confirm that the user 102 is physically present, can prompt the user 102 to insert his or her payment instrument into a payment reader associated with the merchant device (or otherwise cause an interaction between the payment instrument and the payment reader), ask the user 102 personal questions associated with the user 102 (e.g., which can be provided to the merchant from the IDV module 110, etc.), etc. Such interactions between the merchant and the user 102 can be used by the IDV module 110 to verify the identity of the user 102. That is, the IDV module 110 can determine a score associated with the factor 126 based on IDV information received from the POS application.

In some examples, the merchant can launch an IDV process for verifying the identity of the user 102 via an ecommerce channel. In such an example, the user 102 can visit an online store of a merchant and indicate to the merchant that he or she would like to verify their identity. The merchant can launch an IDV process via an application associated with the online store (which may or may not be the POS application described above), which can enable the transmission of verification information to the IDV module 110. Using the application associated with the online store, the merchant can confirm that the user 102 is electronically present, can prompt the user 102 to provide payment information associated with his or her payment instrument into a payment mechanism associated with the online store, ask the user 102 personal questions associated with the user 102 (e.g., which can be provided to the merchant from the IDV module 110, etc.), etc. Such interactions between the merchant and the user 102 can be used by the IDV module 110 to verify the identity of the user 102. That is, the IDV module 110 can determine a score associated with the factor 126 based on IDV information received from the application associated with the online store. In some examples, IDV information received via an ecommerce channel may be associated with a lower score than IDV information received via a brick-and-mortar channel because in-person verification can be more difficult to spoof than online verification. That is, techniques described herein that are directed to IDV via a (physical) interaction with a merchant at a POS of the merchant can reduce fraud that is associated with IDV.

In an additional or alternative example, techniques similar to those described above with reference to verification via an ecommerce channel of a verified merchant can be implemented by a kiosk or other unmanned computing device. That is, an application associated with the kiosk or other unmanned computing device can be used to launch an IDV process, which can enable the transmission of verification information to the IDV module 110. Such verification information can be used to determine a score associated with a particular factor and/or verify an identity of the user 102.

Moreover, in at least one example, the merchant may not know that the user 102 is visiting the merchant for verification purposes and the user 102 can participate in a transaction (e.g., to purchase or otherwise acquire goods or services from the merchant). The POS application of the merchant can determine transaction data, which can include but is not limited to, a name of the merchant, an address of the merchant, item(s) acquired via the transaction, a type (e.g., credit, debit, etc.) of a payment instrument from which the payment information is accessed, a number associated with the payment instrument 130, a verification value (e.g., PVKI, PVV, CVV, CVC, etc.) associated with the payment instrument, an expiration date associated with the payment instrument, a PAN corresponding to the merchant, restrictions on what types of charges/debts can be made, etc. In some examples, at least some of the transaction data can be encrypted. In at least one example, the IDV module 110 can use the transaction data to verify the identity of the user 102. That is, transaction data evidencing that the user 102 physically visited one of the merchants can be used by the IDV module 110 to verify the identity of the user 102.

Payment information associated with a payment instrument can be used for additional or alternative verification purposes as well. For instance, the IDV module 110 can access payment history associated with the payment information (e.g., based on stored records associated with the service provider and/or a third-party service provider) and can correlate the payment history with other identifying information (e.g., as provided by the user 102). For example, the IDV module 110 can compare retrieved payment history with an address provided by the user 102 to verify the address, and the IDV module 110 can determine a score associated with the factor 126 based on the comparison. Further, the IDV module 110 can prompt the user 102 to answer questions based on the payment history (e.g., via the IDV UI 108). In such an example, the IDV module 110 can compare answers to the questions (e.g., by the user 102) to the payment history to determine a score associated with the factor 126.

In some examples, the payment information can be used to perform a CNP transaction. For the purpose of this discussion, a CNP transaction is a transaction that is conducted using payment information associated with a payment instrument without the physical payment instrument being read by a payment reader (e.g., via a dip, tap, swipe, or other interaction). That is, the IDV module 110 can cause a CNP transaction to be performed and if the CNP transaction is completed (e.g., thereby representing that the payment information provided is valid), the IDV module 110 can determine a score associated with the factor 126.

Additional details associated with verification by payment instrument (the factor 126) are described below with reference to FIGS. 5-7.

Verification by other technique(s) (the factor(s) 128) represents one or more processes for verifying the identity of the user 102 that are not covered by factors 120-126 above. For instance, the IDV module 110 can initiate a video call with a user to determine whether the user answers the call, is responsive to the call, participates in the call, etc. The video call can be used to verify the identity of the user 102. In such an example, the IDV module 110 can determine a score associated with the factor(s) 128 based at least in part on the user's 102 participation in the video call. In an additional or alternative example, the IDV module 110 can leverage a platform of merchants (or other users) that subscribe to services of the service provider to verify the identity of the user 102. For instance, the IDV module 110 can send a verification request to one or more merchants requesting that they verify the identity of the user (e.g., do you know this user?) and/or provide information about the user (e.g., that is known to them). In such an example, the IDV module 110 can determine a score associated with the factor(s) 128 based at least in part on responses received from the merchants.

As described above, an IDV path can comprise one or more factors. Each of the factors can relate to different aspects of a user's identity. An IDV path can use any of these factors, individually or in combination, in any order. In at least one example, factors of an IDV path can be performed in a particular order, or sequence, as determined by the IDV module 110. As described above, the order of factors presented is not limiting, and any factor can be used alone or in combination to verify the identity of the user 102. Each factor of an IDV path can be performed serially (e.g., one after another), in parallel (e.g., at the same time or substantially same time), etc. Each factor can be associated with a score, as described above. That is, the IDV module 110 can determine a score for each of the factors in an IDV path. In at least one example, the IDV module 110 can aggregate individual scores associated with each of the factors to determine a score 130 for the selected IDV path. In some examples, individual scores associated with individual factors can be weighted such that some factors affect the score 130 more than other factors. Thus, if the user 102 "fails" one of the factors (e.g., a factor does not verify the identity of the user 102, the score associated with the factor does not satisfy a threshold, etc.), the identity of the user 102 can still be verified if the aggregated score 130 indicates such (unless the IDV path only involved the factor and no other factors).

In at least one example, the score 130 can be used to verify the identity of the user. That is, the IDV module 110 can compare the score 130 to a threshold to determine whether the score 130 satisfies the threshold, as illustrated in block 132. In at least one example, if the score 130 does not satisfy the threshold, the verification can fail, as illustrated in block 134. In at least one example, if the score 130 satisfies the threshold, the IDV module 110 can verify the identity of the user 102, as illustrated in block 116.

In at least one example, the score 130 can be used for additional or alternative purposes (e.g., for making additional or alternative IDV decisions). For example, the server computing device(s) 104 can include an additional functional component, an access module 136, which can utilize the score 130 to determine gradated access to service(s) of a service provider. For the purpose of this discussion, services can be "gradated" in that different services can be provided to different users and/or groups of users based on scores output from the IDV paths. In at least one example, the access module 136 can utilize the score 130 to determine (i) types of services available to the user 102, (ii) levels of services available to the user 102, (iii) terms associated with services that are available to the user 102, and so on. For instance, in some examples, if the score 130 meets or exceeds a threshold, or is associated with a particular range, the access module 136 can enable the user 102 to access high-risk services (e.g., high-risk to a service provider), such as lending funds to the user 102, same-day payroll deposits, etc. Conversely, if the score 130 does not meet or exceed the threshold, or is associated with a particular range, the access module 136 can enable the user 102 to access low-risk services (e.g., low-risk to a service provider), such as payment processing services, daily payroll deposits, etc. Additional details associated with gradating services are described below.

In some examples, techniques described above with reference to FIG. 1 can be implemented upon receiving a request from the user 102. In at least one example, the user 102 can request to access a service provided by a service provider. That is, the user 102 can submit a request, for instance via the device 106, to access a peer-to-peer payment service, a payment processing service, a financing service, an inventory management service, or the like. In some examples, the request can be submitted in association with an onboarding process (e.g., to onboard the user 102 to a platform for accessing services of the service provider). However, in additional or alternative examples, techniques described above with reference to FIG. 1 can be performed at any time, including after the user 102 has been onboarded to the platform for accessing services of the service provider. In some examples, techniques described above with reference to FIG. 1 can be performed responsive to an onboarded user requesting access to a new service. In additional or alternative examples, techniques described above with reference to FIG. 1 can be performed at a particular frequency, after a lapse of a period of time, etc. In examples where techniques described above with reference to FIG. 1 are performed after the user 102 is onboarded, the identifying information and/or other information associated with the user can be stored in a user profile maintained by the server computing device(s) 104. That is, in such examples, the IDV module 110 can access a user profile for accessing identifying information and/or information utilized for performing verification by one or more of the factors.

Techniques described with reference to FIG. 1, can be used to determine whether users can access any of the aforementioned services provided by the service provider, a level of the aforementioned services that the users can access, terms associated with any of the aforementioned services, and so on. Furthermore, in some examples, techniques described herein can be used for any IDV purpose. That is, techniques described herein can be used by any service provider assisting a user with opening an account. Techniques described herein can be used for lenders in determining who and how much to lend loan applicants. Further, techniques described herein can be used for verifying that an individual is of legal age to make a purchase (e.g., 21 to purchase alcohol, 18 to purchase tobacco, etc.).

While FIG. 1 illustrates the identifying information 112 being provided by the user 102 directly to the server computing device(s) 104. In an additional or alternative example, the server computing device(s) 104 can offer IDV services for the benefit of other service providers (e.g., IDV as a service). In such an example, the user 102 can provide their identifying information 112 to another service provider, which can send a request for IDV based on the identifying information 112 provided to the other service provider. That is, in such an example, the identifying information 112 can be received by the server computing device(s) 114 indirectly, via intermediary computing device(s) associated with the other service provider. In such an example, the server computing device(s) 104 can send an indication to the other service provider regarding whether the identity of the user 102 has been verified. In some examples, the server computing device(s) 104 may provide the score 130 to the other service provider and the other service provider can utilize the score for determining whether to grant the user 102 access to their services and/or gradated access to their services.

Figure 2:
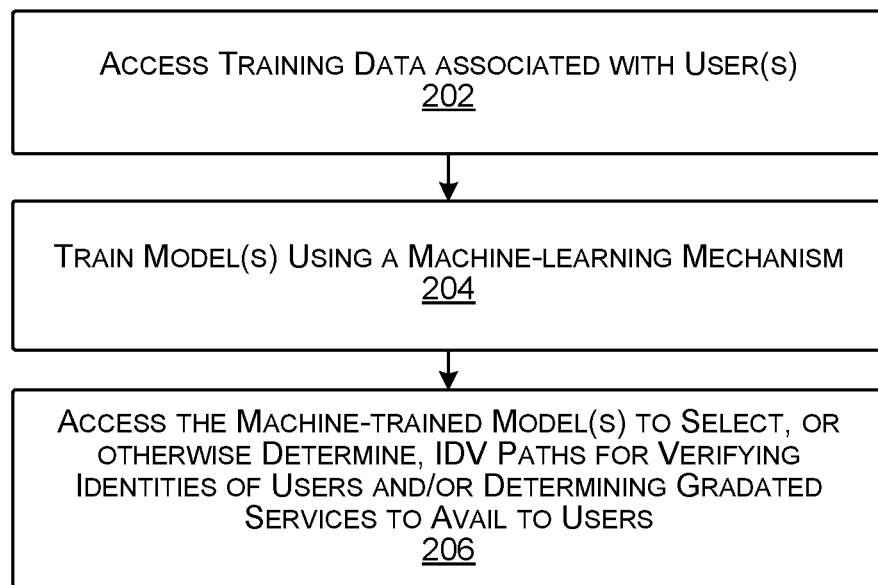
FIG. 2 illustrates an example process for training one or more models using a machine-learning mechanism, as described herein.

FIG. 2 illustrates an example process 200 for training one or more models using a machine-learning mechanism, as described herein. In at least one example, the server computing device(s) 104 can be associated with a functional component (e.g., a training module) for training one or more models, which can be used by the IDV module 110 for selecting, or otherwise determining, an IDV path for verifying an identity of a user and/or determining gradated access to services.

Block 202 illustrates accessing training data associated with user(s). In at least one example, the training module can access training data associated with one or more users. The training data can comprise IDV data associated with previous IDV processes. For example, the IDV data can include identifying information previously provided by user(s) for the purpose of identifying their identity, one or more factors and/or IDV paths previously used to verify the identities of the user(s), indications of IDV processes (e.g., binary indication(s) (verified or not), score(s), etc.), and so on. In some examples, the training data can include information associated with requests to access services and resulting gradated access granted (or refused) responsive to such requests. Further, the training data can include indications of successful IDV processes and, for unsuccessful IDV processes, where the users dropped off (e.g., at what point in an IDV path did a user terminate the IDV process or otherwise not proceed). In at least one example, the training data can include context data associated with requests to access services. For instance, such context data can indicate Internet Protocol (IP) addresses associated with such requests, datestamps associated with such requests, timestamps associated with such events, etc. Further, in at least one example, the training data can include demographic data associated with the user(s), which can include, but is not limited to age, address, occupation, and the like.

In some examples, the training data can be associated with a single user or a plurality of users. In at least one example, the training data can be associated with a cohort (e.g., group) of similar users. Users of such a cohort can have one or more characteristics in common and/or can be associated with similarity scores that meet or exceed a threshold.

Block 204 illustrates training model(s) using a machine-learning mechanism. In at least one example, the training module can train one or more models using a machine learning mechanism. In such an example, the model(s) can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The resulting model(s) can output a recommended IDV path for a user. The output can identify one or more factors to include in the IDV path and/or an order for executing process(es) associated with each of the one or more factors. In at least one example, an indication of an IDV path of a plurality of IDV paths can be output by the machine-trained model. In an additional or alternative example, a plurality of factors that comprise an IDV path can be output by the machine-trained model. That is, a machine-trained model can analyze new input data (e.g., associated with identifying information of a user, service(s) for which access is requested, context associated with such requests, etc.) and can output a recommended IDV path, or factor(s) for fulfilling an IDV path, for the requesting user.

One or more models can be trained via the training model. In some examples, individual models can be trained on particular subsets of training data. For instance, a model can be trained using a machine-learning mechanism based on data associated with a single user. In such an example, the model can be particular to the user. In an additional or alternative example, a model can be trained using a machine-learning mechanism based on data associated with a cohort of users. In such an example, the model can be particular to the cohort of users. Moreover, in at least one example, a model can be trained using a machine-learning mechanism based on data associated with a population of users (e.g., all users who have previously been subjected to IDV in association with the service provider). In such an example, the model can be particular to the population of users. In at least one example, the model(s) can be stored in association with the server computing device(s) 104 for use at a later time.

Block 206 illustrates accessing the machine-trained model(s) to select, or otherwise determine, IDV paths for verifying identities of users and/or determining gradated services to avail to users. In at least one example, responsive to determining to use an IDV path, the IDV module 110 can access the machine-trained model(s) to select, or otherwise determine, IDV paths for verifying identities of users and/or determining gradated services to avail to users. In at least one example, the IDV module 110 can determine that a user, such as the user 102, is associated with a cohort of users of which a machine-trained model is associated. That is, the IDV module 110 can utilize characteristics of the user 102 to determine similarity scores between the user 102 and users associated with cohorts of users. If a similarity score meets or exceeds a threshold for a cohort (i.e., the user 102 has one or more characteristics that are similar to other users in the cohort), the user 102 can be determined to be associated with the cohort and a machine-trained model trained on IDV data associated with the cohort of users can be used by the IDV module 110 to select, or otherwise determine, the IDV path for the user. In additional or alternative examples, the IDV module 110 can use a machine-trained model trained on data associated with the user 102 (e.g., a personalized model) or a machine-trained model trained on data associated with a larger population of users.

The machine-trained model(s) can be updated over time. That is, training data can be updated at a particular frequency, after a lapse of a period of time, responsive to receiving an instruction to update the training data, in near-real-time, etc. The training module can implement the machine-learning mechanism(s) at a particular frequency, after a lapse of a period of time, responsive to receiving an instruction to update the model(s), in near-real-time, etc. to update the machine-trained model(s). Such updated machine-trained model(s) can be stored in association with the server computing device(s) 104 for use at a later time, as described above. As a result, previous IDV operations can be used to improve the overall IDV experience by improving the accuracy and relevance of the machine-trained model(s) used to select, or otherwise determine, machine-trained model(s) for future IDV operations.

Figure 3:
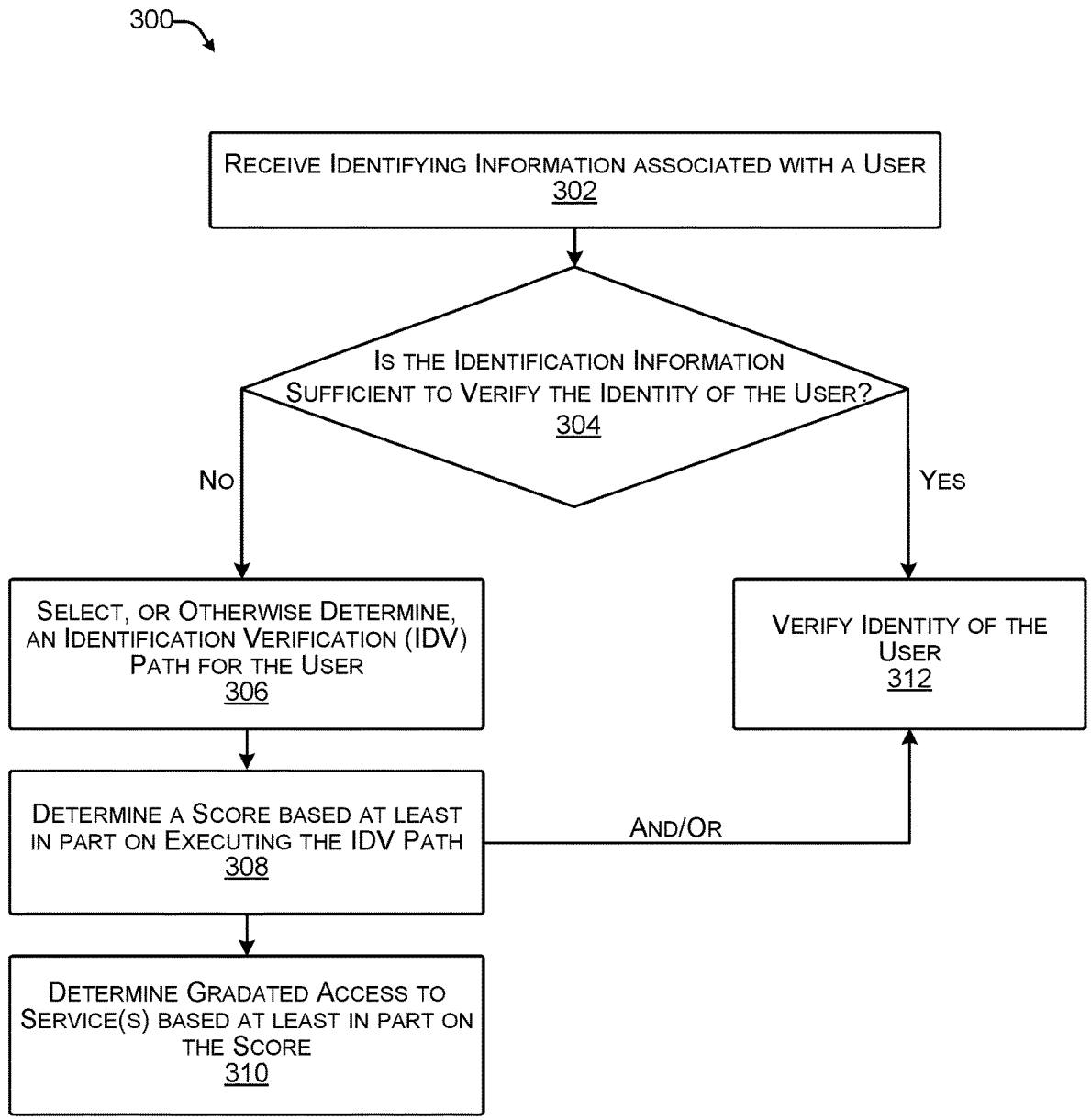
FIG. 3 illustrates an example process for selecting, or otherwise determining, an identity verification (IDV) path that can be used for verifying an identity of a user, as described herein.

FIG. 3 illustrates an example process for selecting, or otherwise determining, an IDV path that can be used for verifying an identity of a user, as described herein.

Block 302 illustrates receiving identifying information associated with a user. In at least one example, the user 102 can provide identifying information 112 to the server computing device(s) 104, for example via the IDV UI 108. In some examples, the identifying information 112 can be PII, as described above. The identifying information 112 can additionally or alternatively include other information (that may or may not be PII) that can be used to identify the user 102. In some examples, if the user 102 is a merchant (e.g., an entity providing goods or services to others), the identifying information 112 can be associated with information that can be used to identify the merchant (e.g., business name, tax identification number (e.g., an Employer Identification Number (EIN), etc.).

In at least one example, the identifying information can be received responsive to a request for identifying information (e.g., from the service provider). In some examples, the identifying information can be received during an onboarding process (e.g., to onboard the user 102 to a platform for accessing services of the service provider). In additional or alternative examples, the identifying information can be submitted in association with a request to access one or more services of a service provider, which may or may not be associated with the onboarding process.

Block 304 illustrates determining whether the identification information is sufficient to verify the identity of the user. The IDV module 110 can receive the identifying information 112 and can determine whether the identifying information 112 is sufficient to verify the identity of the user 102, as is shown in block 114. That is, the IDV module 110 can analyze the identifying information 112 and determine whether the identifying information 112 corresponds to an identifiable entity (e.g., person, merchant, etc.). In some examples, the IDV module 110 can determine that the identifying information 112 does not correspond to an identifiable entity (e.g., person, merchant, etc.). Alternatively, the IDV module 110 can determine that the identifying information 112 corresponds to an identifiable entity, but a level of uncertainty associated with the determination can be such that the IDV module 110 can determine that the identifying information 112 is insufficient to verify the identity of the user 102. In either example, the IDV module 110 can select, or otherwise determine, an IDV path for the user 102, as illustrated in block 306.

In at least one example, responsive to determining that an IDV path is necessary to verify the identity of the user 102 (e.g., based on determining that the identifying information 112 is not sufficient to verify the identity of the user 102), the IDV module 110 can access previously trained machine-trained model(s) from a storage associated with the server computing device(s) 104. The identifying verification module 110 can use the machine-trained model(s) to select an IDV path for the user 102. In at least one example, the IDV module 110 can determine that the user 102 is associated with a cohort of users of which a machine-trained model is associated. That is, the IDV module 110 can utilize characteristics of the user 102 to determine similarity scores between the user 102 and users associated with cohorts of users. If a similarity score meets or exceeds a threshold for a cohort (i.e., the user 102 has one or more characteristics that are similar to other users in the cohort), the user 102 can be determined to be associated with the cohort and a machine-trained model trained on IDV data associated with the cohort of users can be used by the IDV module 110 to select, or otherwise determine, the IDV path for the user 102. In additional or alternative examples, the IDV module 110 can use a machine-trained model trained on data associated with the user 102 (e.g., a personalized model) or a machine-trained model trained on data associated with a larger population of users.

In at least one example, the machine-trained model(s) can analyze the identifying information 112, any request(s) for service(s) to be accessed, context associated with the request(s) (e.g., IP address, datestamp, timestamp, geolocation, etc.), etc. to select, or otherwise determine, an IDV path for the user 102. That is, IDV paths may be different for different users, different services, different contexts, etc. In an example, a first IDV path for verifying the identity of a first user requesting to access a high-risk service may be different than a second IDV path for verifying the identity of a second user requesting to access a low-risk service. For instance, the first IDV path may include more factors, or different factors, than the second IDV path. Context and/or user information can additionally or alternatively influence the selection or determination of an IDV path for the user 102.

Block 308 illustrates determining a score based at least in part on executing the IDV path. In at least one example, the IDV module 110 can utilize the IDV path to determine a score associated with the user 102. In at least one example, the score can be representative of (i) whether identifying information provided by a customer (or potential customer) accurately identifies the customer (or potential customer) (i.e., Is the customer who they say they are?) and/or (ii) a confidence value indicating how confident the IDV module 110 is that the user 102 is accurately identified.

As described above, an IDV path can comprise one or more factors, which can include but are not limited to, verification by phone number (the factor 120), verification by bank account credentials (the factor 122), verification by legally identifying documents (the factor 124), verification by payment card information (the factor 126), and verification by other technique(s) (the factor(s) 128). Each of the factors can relate to different aspects of a user's identity. An IDV path can use any of these factors, individually or in combination, in any order. In at least one example, factors of an IDV path can be performed in a particular order, or sequence, as determined by the IDV module 110. The order of factors presented in FIG. 1 is not limiting, and any factor can be used alone or in combination to verify the identity of the user 102. As described above, each factor of an IDV path can be performed serially (e.g., one after another), in parallel (e.g., at the same time or substantially same time), etc.

In at least one example, each factor can be associated with a score, as described above. That is, the IDV module 110 can determine a score for each of the factors in an IDV path. In at least one example, the IDV module 110 can aggregate individual scores associated with each of the factors to determine a score for the selected IDV path. In some examples, individual scores associated with individual factors can be weighted such that some factors affect the score more than other factors. Thus, if the user 102 "fails" one of the factors (e.g., a factor does not verify the identity of the user 102, the score for the factor does not satisfy a threshold, etc.), the identity of the user 102 can still be verified if the aggregated score indicates such (unless the IDV path only involved the factor and no other factors).

Block 310 illustrates determining gradated access to service(s) based at least in part on the score. In at least one example, the score can be used to determine gradated access to service(s). For example, the access module 136 can utilize the score to determine gradated access to service(s) of a service provider. In at least one example, the access module 136 can utilize the score to determine (i) types of services available to the user 102, (ii) levels of services available to the user 102, (iii) terms associated with services that are available to the user 102, and so on. For the purpose of this discussion, "levels" of services can offer different features and/or impose different restrictions. Further, "terms" can define aspects of the relationship between the user 102 and the service provider for receiving or providing services, respectively. In a non-limiting example, a term associated with a payment processing service may define a fee paid per transaction by a merchant, a term associated with a loan product may define a length of the loan or an interest rate.

Block 312 illustrates verifying the identity of the user. Based at least in part on the IDV module 110 determining that the identifying information 112 corresponds to an identifiable entity (e.g., person, merchant, etc.), and in some examples, with a level of certainty that satisfies a threshold, the IDV module 110 can verify the identity of the user 102. Additionally or alternatively, in at least one example, the score can be used to verify the identity of the user. That is, the IDV module 110 can compare the score to a threshold to determine whether the score satisfies the threshold. In at least one example, if the score does not satisfy the threshold, the verification can fail. In at least one example, if the score satisfies the threshold, the IDV module 110 can verify the identity of the user 102. In at least one example, the threshold can be configurable by the service provider. For instance, in at least one example the threshold can be set for particular service(s) that are available via the service provider.

Figure 4:
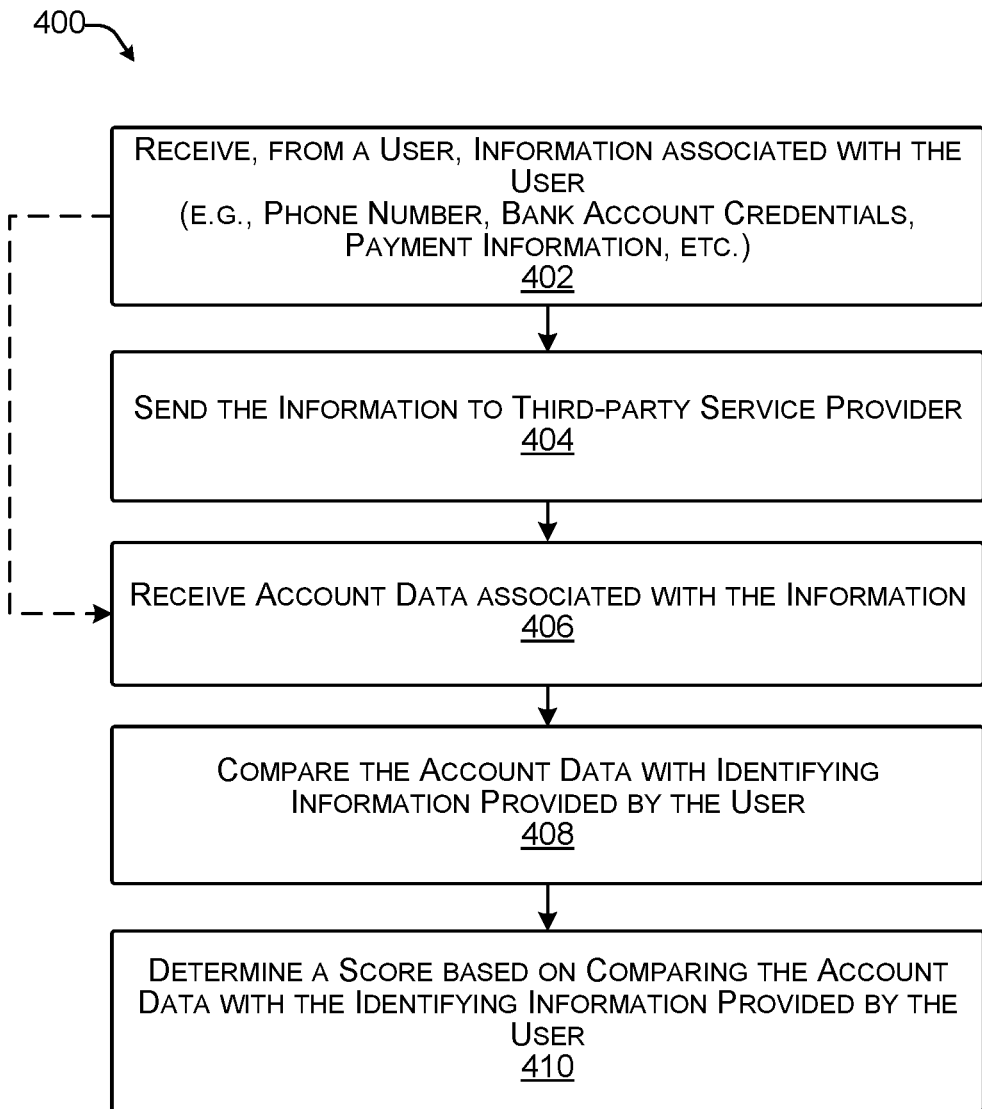
FIG. 4 illustrates an example process for determining a score associated with a factor of an IDV path, as described herein.

FIG. 4 illustrates an example process 400 for determining a score associated with a factor of an IDV path, as described herein.

Block 402 illustrates receiving, from a user, information associated with the user (e.g., phone number, bank account credentials, legally identifying documents, payment card information, etc.). In at least one example, the IDV module 110 can prompt the user 102 to provide information associated with the user 102. Such information can include, but is not limited to, a telephone number, bank account credentials, payment information associated with a payment instrument, etc. The user 102 can input the information via the IDV UI 108. In at least one example, such information can be requested responsive to determining that previously provided identifying information 112 is insufficient to verify the identity of the user 102 and an IDV path is selected for the user 102. The information can be relevant to a particular factor in the IDV path.

Block 404 illustrates sending the information to a third-party service provider. In at least one example, responsive to receiving the information, the IDV module 110 can send a request to a third-party service provider (e.g., server computing device(s) associated therewith). In at least one example, the information can be sent to an API provided by a third-party service provider. For instance, if the information is a telephone number, the information can be sent to a telecommunications service provider (e.g., via an API provided by the telecommunications service provider) that enables the IDV module 110 to request and/or receive information associated with users who subscribe to services of the telecommunications service provider. Or, if the information is bank account credentials and/or payment information associated with a payment instrument, the IDV module 110 can send the information associated with the bank account of the user 102 to the appropriate bank (e.g., via an API provided by the bank) and/or a third-party service provider that manages personal finances on behalf of users (e.g., PLAID®, MONEYDANCE®, BANKTIVITY®, etc.).

Block 406 illustrates receiving account data associated with the information. In at least one example, the third-party service provider can provide account data associated with the information to the IDV module 110. That is, the third-party service provider can return account data to the IDV module 110. In at least one example, the telecommunications service provider (e.g., via an API provided by the telecommunications service provider) can return an indication of whether the telephone number is associated with an account of the telecommunications service provider. Additionally or alternatively, a bank (e.g., via an API provided by the bank) and/or a third-party service provider that manages personal finances on behalf of users can send information associated with the bank account of the user 102 and/or a payment instrument of the user 102 to the IDV module 110 (with permission of the user 102).

Block 408 illustrates comparing account data with identifying information provided by the user. In at least one example, the IDV module 110 can compare received account data with identifying information 112 received from the user 102. In at least one example, the IDV module 110 can determine a score for a particular factor based at least in part on comparing the account data with the identifying information provided by the user 102, as illustrated in block 410. For example, the IDV module 110 can determine a score associated with the factor 120 based on a similarity between the information received from the telecommunications service provider and the identifying information 112 received from the user 102. Further, in at least one example, IDV module 110 can compare the information received from the bank and/or the third-party service provider with the identifying information 112 received from the user 102 to determine a score for the factor 122. Moreover, in at least one example, IDV module 110 can compare the information received from the bank and/or the third-party service provider with the identifying information 112 received from the user 102 to determine a score for the factor 126.

While FIG. 4 is described in the context of sending the information to a third-party service provider, in some examples, the service provider associated with the server computing device(s) 104 can be associated with a data store storing at least some account data of the user 102 (e.g., in association with a user profile). For example, if the service provider offers a payment processing service, the service provider may store transaction history associated with a payment instrument of the user 102. In such an example, the IDV module 110 may not send the information to the third-party service provider but, instead, may send the information to a functional component of the server computing device(s) 104 (e.g., a data store). The IDV module 110 can then receive account data from the other functional component of the server computing device(s) 104. The aforementioned example is represented by the dashed line between block 402 and 406.

Figure 5:
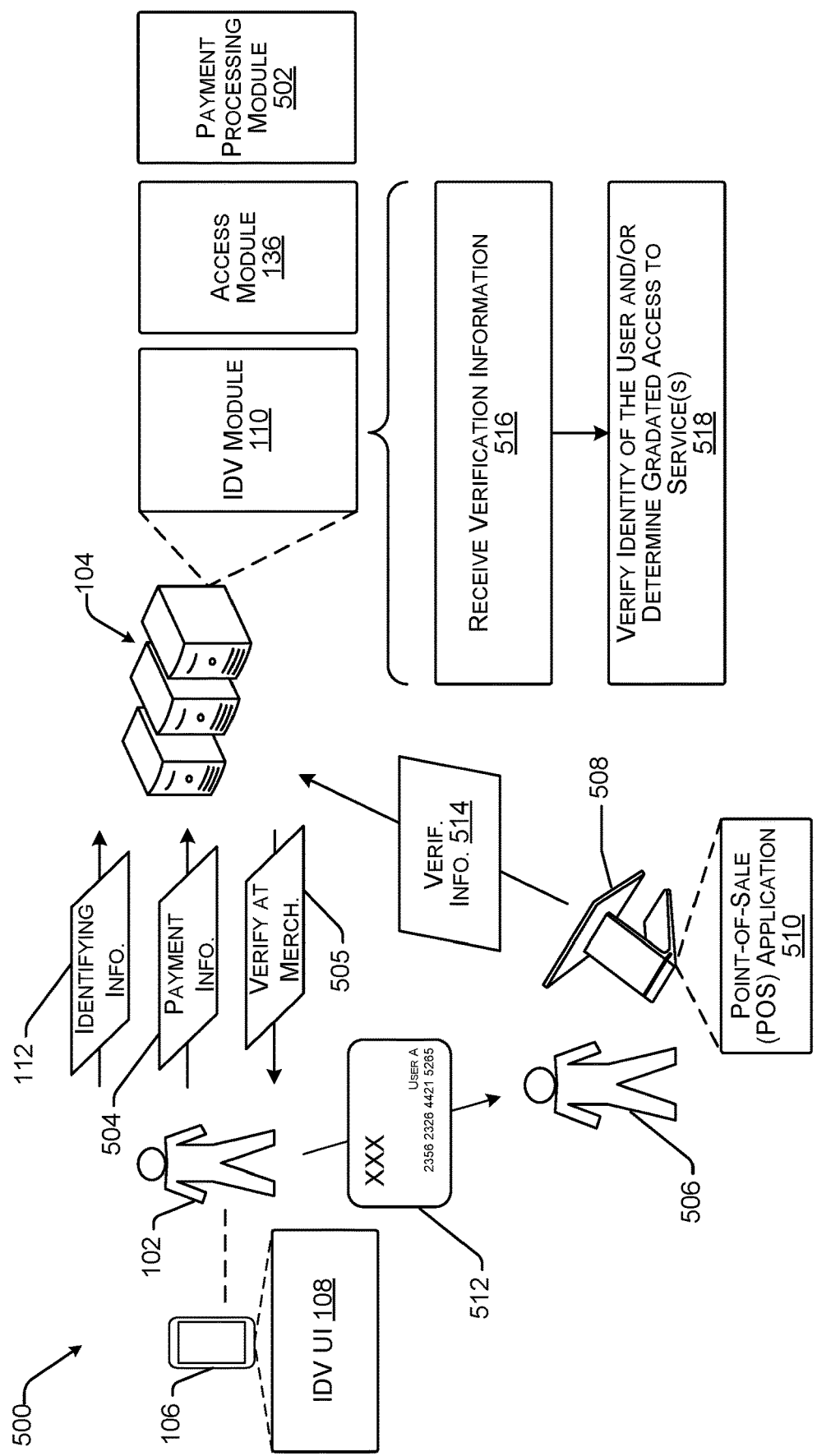
FIG. 5 illustrates an example environment for, among other things, using payment information associated with a payment instrument to verify an identity of a user, as described herein.

FIG. 5 illustrates an example environment 500 for, among other things, using payment information associated with a payment instrument to verify an identity of a user, as described herein. The example environment 500 can include aspects of the example environment described above with reference to FIG. 1. For instance, the example environment 500 can include a user 102 that can communicate with the server computing device(s) 104 via a device 106. The device 106 can present an IDV UI 108, which can facilitate the interactions between the user 102 and the service provider associated with the server computing device(s) 104. For instance, the user 102 can provide identifying information 112 to the server computing device(s) 104 via the IDV UI 108.

In at least one example, the server computing device(s) 104 can be associated with one or more functional components, which can include the IDV module 110, the access module 136, and a payment processing module 502. Additional details associated with the payment processing module 502 are described below.

As described above, in at least one example, the IDV module 110 can determine that the identifying information 112 is insufficient to verify the identity of the user 102. As such, the IDV module 110 can prompt the user 102 to provide payment information 504 associated with a payment instrument of the user 102. In additional or alternative examples, the IDV module 110 can prompt the user 102 to provide payment information 504 at any other time, which can be related or unrelated to the provisioning of the identifying information 112. Payment information 504 can include, but is not limited to, a number associated with a payment instrument, a verification value (e.g., PVKI, PVV, CVV, CVC, etc.) associated with the payment instrument, an expiration date associated with the payment instrument, etc. In at least one example, the user 102 can provide the payment information 504 via the IDV UI 108.

In at least one example, the IDV module 110 can send an instruction 505 instructing the user 102 to interact with a merchant and, based on such an interaction, the IDV module 110 can verify the identity of the user 102 and/or determine gradated services to avail to the user 102. As described above, in at least one example, the merchant can be a trusted merchant such that the merchant has been shown to be reliable. For example, the service provider can access user profiles associated with individual merchants to review transaction histories, processing volumes (e.g., of payment processed), lengths of relationships with the service provider, previous complaints concerning merchants, inquiries regarding fraudulent behavior, and so on to determine whether individual merchants are reliable and thus trusted.

In at least one example, the IDV module 110 can send a list comprising one or more merchants to the device 106 of the user 102. The list can be presented via the IDV UI 108. The user 102 can then interact with one or more of the merchants on the list to verify their identity. In at least one example, the list can comprise one or more trusted merchants. In an additional or alternative example, the list of merchants can be selected based on a characteristic of the user 102. For instance, the IDV module 110 can determine a geolocation associated with the user 102 (e.g., based on an address provided, a Global Positioning System (GPS) signal associated with the device 106, etc.) and can identify one or more merchants that are within a threshold distance of the geolocation associated with the user 102. The IDV module 110 can generate the list based at least in part on the one or more merchants that are within a threshold distance of the geolocation associated with the user 102. Of note, the one or more merchants can be provided to the user 102 in a list, as described above, or in any other configuration.

Environment 500 illustrates a single merchant 506, but any number of merchants can be included in such an environment. The merchant 506 can operate a merchant device 508. The merchant device 508 can have an instance of a POS application 510 stored thereon. The POS application 510 can configure the merchant device 508 as a POS terminal, which enables the merchant 506 to perform transactions with one or more customers. In some examples, the user 102 can be a customer of the merchant 506. For the purpose of this discussion, transactions that occur between the merchant 506 and customer(s) at a POS terminal can be referred to as "POS transactions" and/or "transactions." In at least one example, the POS application 510 can determine transaction data associated with the POS transactions. Transaction data can include payment instrument data (e.g., a number associated with the payment instrument 512, a verification value (e.g., PVKI, PVV, CVV, CVC, etc.) associated with the payment instrument 512, an expiration date associated with the payment instrument 512, etc.), which can be obtained from a reader device associated with the merchant device 508, user authentication data, purchase amount information, point-of-purchase information (e.g., item(s) purchased, date of purchase, time of purchase, etc.), etc. The POS application 510 can send transaction data to the server computing device(s) 502. Furthermore, the POS application 510 can present a UI to enable the merchant 506 to interact with the POS application 510 and/or the service provider associated with the server computing device(s) 104 via the POS application 510.

The payment processing module 502 can process payments for POS transactions. In at least one example, the payment processing module 502 may send the transaction data to server computing device(s) associated with card networks and/or card issuers, which may determine whether the transaction is authorized based on the transaction data. The server computing device(s) associated with card networks and/or card issuers may send an authorization notification to the payment processing module 502, which may send the authorization notification to POS application 510 to indicate whether the payment transaction is authorized. The payment processing module 502 may also transmit additional information such as transaction identifiers to POS application 510.

The payment processing module 502 can additionally or alternatively maintain accounts on behalf of merchants that subscribe to payment processing services provided by the service provider. That is, funds received in association with POS transactions processed by the payment processing module 502 can be maintained in accounts respectively corresponding to the merchants. Such funds can be accessible by payment instruments linked to the accounts and/or can be deposited into bank accounts of the merchants at a particular frequency and/or on demand (e.g., via instant deposit).

In at least one example, the user 102 can visit a brick-and-mortar location of the merchant 506 and tell, or otherwise communicate to, the merchant 506 that he or she is there to verify their identity. The merchant 506 can launch an IDV process via the POS application 510. The IDV process can enable the merchant 506 to transmit verification information 514 to the IDV module 110. Using the POS application 510, the merchant can confirm that the user 102 is physically present, can prompt the user 102 to insert his or her payment instrument 512 into a payment reader associated with the merchant device 508 (or otherwise cause an interaction between the payment instrument 512 and the payment reader), ask the user 102 personal questions associated with the user 102 (e.g., which can be provided to the merchant from the IDV module 110, etc.), etc. For the purpose of this discussion, such information can be referred to as "verification information" 514, which can be any data obtained in association with the IDV process that is helpful for verifying an identity of the user 102. For instance, "verification information" 514 can refer to data confirming that the user 102 is physically present, payment instrument data received responsive to the user 102 inserting his or her payment instrument 512 into (or otherwise causing an interaction with) a payment reader associated with the merchant device 508, responses to personal questions associated with the user 102, and so on. Such interactions between the merchant and the customer, which can be represented as verification information 514, can be used by the IDV module 110 to verify the identity of the user 102 and/or determine gradated access to service(s). That is, the IDV module 110 can receive the verification information 514, as illustrated in block 516, and can verify an identity of the user 102 and/or determine gradated access to service(s) based at least in part on the verification information 514, as illustrated in block 518. In some examples, the IDV module 110 can determine a score based on verification information 514 received from the POS application 510 and the score can be used to verify the identity of the user 102 and/or determine gradated access to services, as described above.

In an additional or alternative example, the user 102 can visit a brick-and-mortar location of the merchant 506 and the merchant 506 may not know that the user 102 is visiting the merchant 506 for verification purposes. In such an example, the user 102 can participate in a transaction with the merchant 506 (e.g., to purchase or otherwise acquire goods or services from the merchant). The user 102 can present his or her payment instrument 512 to the merchant 506 to satisfy a cost of the transaction. While the payment instrument 512 is illustrated as a physical card, in some examples, the payment instrument 512 can be a virtual card stored in a wallet application of the device 106 and/or can otherwise be associated with the device 106.

The POS application 510 can determine transaction data associated with the transaction, which can include but is not limited to, a name of the merchant, an address of the merchant, item(s) acquired via the transaction, a type (e.g., credit, debit, etc.) of the payment instrument 512, payment instrument data (e.g., a number associated with the payment instrument 512, a verification value (e.g., PVKI, PVV, CVV, CVC, etc.) associated with the payment instrument 512, an expiration date associated with the payment instrument 512, etc.), a PAN corresponding to the merchant, restrictions on what types of charges/debts can be made, etc. The POS application 510 can transmit the transaction data, which can include payment instrument data, to the server computing device(s) 104. In at least one example, the verification information 514 can comprise transaction data, which can include payment instrument data. In at least one example, the IDV module 110 can access the verification information 514 (e.g., transaction data), as illustrated in block 516, and can verify an identity of the user 102 and/or determine gradated access to service(s) based at least in part on the verification information 514, as illustrated in block 518. In some examples, the IDV module 110 can determine a score based on verification information 514 received from the POS application 510 and the score can be used to verify the identity of the user 102 and/or determine gradated access to services, as described above.

As described above, payment information 504 associated with a payment instrument can be used for additional or alternative verification purposes as well. For instance, the IDV module 110 can access payment history associated with the payment information 504 (e.g., based on stored records associated with the service provider and/or a third-party service provider) and can correlate the payment history with other identifying information (e.g., as provided by the user 102). For example, the IDV module 110 can compare retrieved payment history with an address provided by the user 102 to verify the address, and the IDV module 110 can verify the identity of the user 102 and/or determine gradated access to services based at least in part on the comparison. Further, the IDV module 110 can prompt the user 102 to answer questions based on the payment history (e.g., via the IDV UI 108). In such an example, the IDV module 110 can compare answers to the questions (e.g., by the user 102) to the payment history to verify the identity of the user 102 and/or determine gradated access to services based at least in part on the comparison.

In some examples, the payment information 504 can be used to perform a CNP transaction. That is, the IDV module 110 can cause a CNP transaction to be performed and if the CNP transaction is completed (e.g., thereby representing that the payment information provided is valid), the IDV module 110 can verify the identity of the user 102 and/or determine gradated access to services based at least in part on the completion of the CNP transaction.

Figure 6:
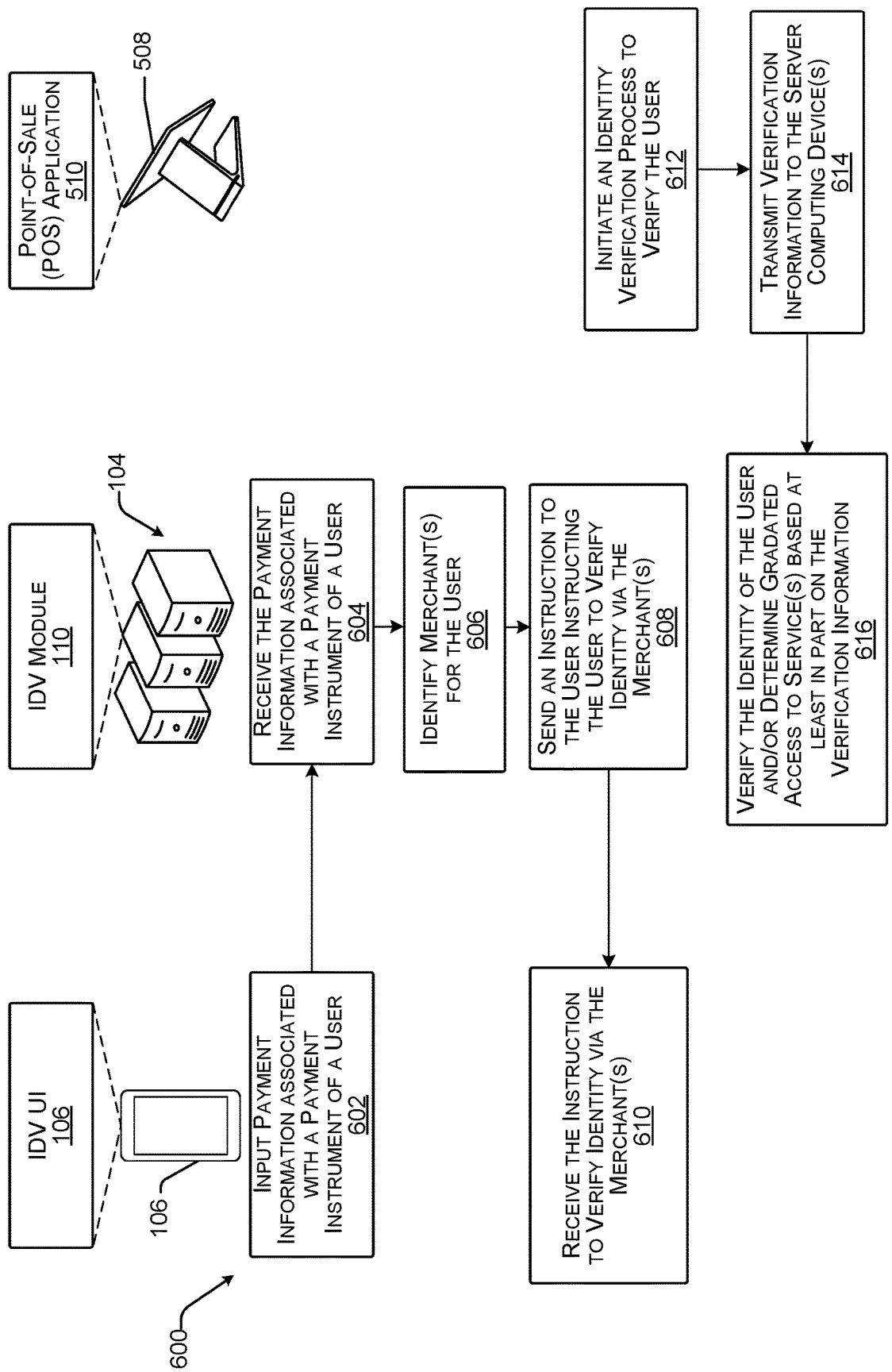
FIG. 6 illustrates an example process for verifying an identity of a user and/or determining gradated access to service(s) based at least in part on verification information received from a merchant device of a merchant, as described herein.

FIG. 6 illustrates an example process 600 for verifying an identity of a user and/or determining gradated access to service(s) based at least in part on verification information received from a merchant device of a merchant, as described herein.

Block 602 illustrates inputting payment information associated with a payment instrument of a user. As described above, the user 102 can provide payment information to the server computing device(s) 104 via the IDV UI 108. In at least one example, the user 102 can provide the payment information responsive to a request for the payment information from the IDV module 110. Such payment information can include a number associated with a payment instrument, a verification value (e.g., PVKI, PVV, CVV, CVC, etc.) associated with the payment instrument, an expiration date associated with the payment instrument, etc. In at least one example, the IDV module 110 can receive the payment information, as illustrated in block 604.

Block 606 illustrates identifying merchant(s) for the user. In at least one example, the IDV module 110 can determine a list of one or more merchants for the user to verify their identity based on a characteristic of the one or more merchants. For example, the IDV module 110 can identify merchant(s) for the user by selecting one or more trusted merchants. That is, in at least one example, the IDV module 110 can determine a list of one or more merchants based on a characteristic of the one or more merchants (e.g., trusted). Furthermore, in some examples, merchants can be associated with a verification score (or other indicator), which can be based on their verification history. For instance, if a merchant has successfully identified a number of users above a threshold, the merchant can be associated with a verification score above a threshold. In some examples, the IDV module 110 can determine the list of one or more merchants based on the verification score. In additional or alternative examples, the IDV module 110 can determine the list of one or more merchants based on a location of the merchant(s) (e.g., relative to a location of a user). Additional or alternative characteristics can be used for identifying merchant(s) for the user.

In an additional or alternative example, the IDV module 110 can determine a list of one or more merchants based on a characteristic of the user 102. For instance, the IDV module 110 can determine a characteristic associated with the user 102 and can identify one or more merchants based at least in part on the characteristic.

The IDV module 110 can generate the list based at least in part on the one or more merchants that are identified. In some examples, a number of merchants comprising the list can be based on a characteristic of the merchant(s) and/or the user.

Block 608 illustrates sending an instruction to the user instructing the user to verify identity via the merchants. In at least one example, the IDV module 110 can send an instruction instructing the user 102 to interact with one or more merchants. In at least one example, the instruction can include a list comprising one or more merchants.

Block 610 illustrates receiving the instruction to verify identity via the merchant(s). In at least one example, the IDV user interface 108 can present the list of one or more merchants to the user 102, with an instruction to visit a particular number of the one or more merchants to verify their identity.

Block 612 illustrates initiating an IDV process to verify the identity of the user. In at least one example, the user 102 can visit a brick-and-mortar location of the merchant 506 and tell, or otherwise communicate to, the merchant 506 that he or she is there to verify their identity. The merchant 506 can launch an IDV process via the POS application 510. The IDV process can enable the merchant 506 to transmit verification information 514 to the IDV module 110 (e.g., via the POS application 510). As described above, verification information 514 can refer to any data obtained in association with the IDV process that is helpful for verifying an identity of the user 102. For instance, verification information 514 can include data confirming that the user 102 is physically present, payment instrument data received responsive to the user 102 inserting his or her payment instrument into (or otherwise causing an interaction with) a payment reader associated with the merchant device 508, responses to personal questions associated with the user 102, and so on.

Using the POS application 510, the merchant 506 can confirm that the user 102 is physically present. For instance, the merchant 506 can interact with a control presented via a UI associated with the POS application 510 to confirm that the user 102 is physically present. In at least one example, the merchant 506 can request a legally identifying document (e.g., a driver's license, a passport, etc.) from the user 102. The merchant 506 can interact the control responsive to receiving the legally identifying document. Additionally or alternatively, the merchant 506 can scan the legally identifying document or otherwise generate a copy of the legally identifying document. In some examples, the merchant 506 can capture an image of the user 102 using a camera (which can be associated with the merchant device 508 or another device and provided to the POS application 510) or another biometric indicator of the user 102 using another sensor (which can be associated with the merchant device 508 or another device and provided to the POS application 510).

Furthermore, in at least one example, the merchant 506 can prompt the user 102 to insert his or her payment instrument into a payment reader associated with the merchant device 508 (or otherwise cause an interaction between the payment instrument 512 and the payment reader). The payment reader can obtain payment instrument data, which can be provided to the POS application 510.

Moreover, the merchant 506 can ask the user 102 personal questions associated with the user 102. In at least one example, responsive to initiating the IDV process at the POS, the POS application 510 can receive one or more questions from the IDV module 110. The one or more questions can be based on transaction history associated with the payment instrument or other personal information associated with the user 102. The merchant 506 can input response(s) to the question(s) into the POS application 110, and such responses can be provided to the IDV module 110.

Block 614 illustrates transmitting verification information to the server computing device(s). The POS application 510 can transmit the verification information 514 to the server computing device(s) 104.

Block 616 illustrates verifying the identity of the user and/or determining gradated access to service(s) based at least in part on the verification information. In at least one example, the IDV module 110 can verify the identity of the user 102 and/or determine gradated access to service(s) for the user 102 based at least in part on the verification information 514. That is, the IDV module 110 can receive the verification information 514 and can verify an identity of the user 102 and/or determine gradated access to service(s) for the user 102 based at least in part on the verification information 514. For instance, the IDV module 110 can verify the identity of the user 102 based at least in part on receiving an indication that the user 102 physically visited a brick-and-mortar store of a merchant from the list of merchant(s) provided to the user 102. Additionally or alternatively, the IDV module 110 can verify the identity of the user 102 determine gradated access to service(s) for the user 102 based on comparing received verification information 514 to known information associated with the user 102. As an example, the IDV module 110 can compare an image received from the POS application 110 with another image of the user 102 to determine whether they represent the same person. If the images correspond, the IDV module 110 can verify the identity of the user 102. Or, the IDV module 110 can compare answers (to questions) received from the POS application 110 with known information about the user 102 to determine whether the user 102 accurately answered the questions. In some examples, the IDV module 110 can determine a score based on verification information 514 received from the POS application 510 and the score can be used to verify the identity of the user 102 and/or determine gradated access to services, as described above.

Figure 7:
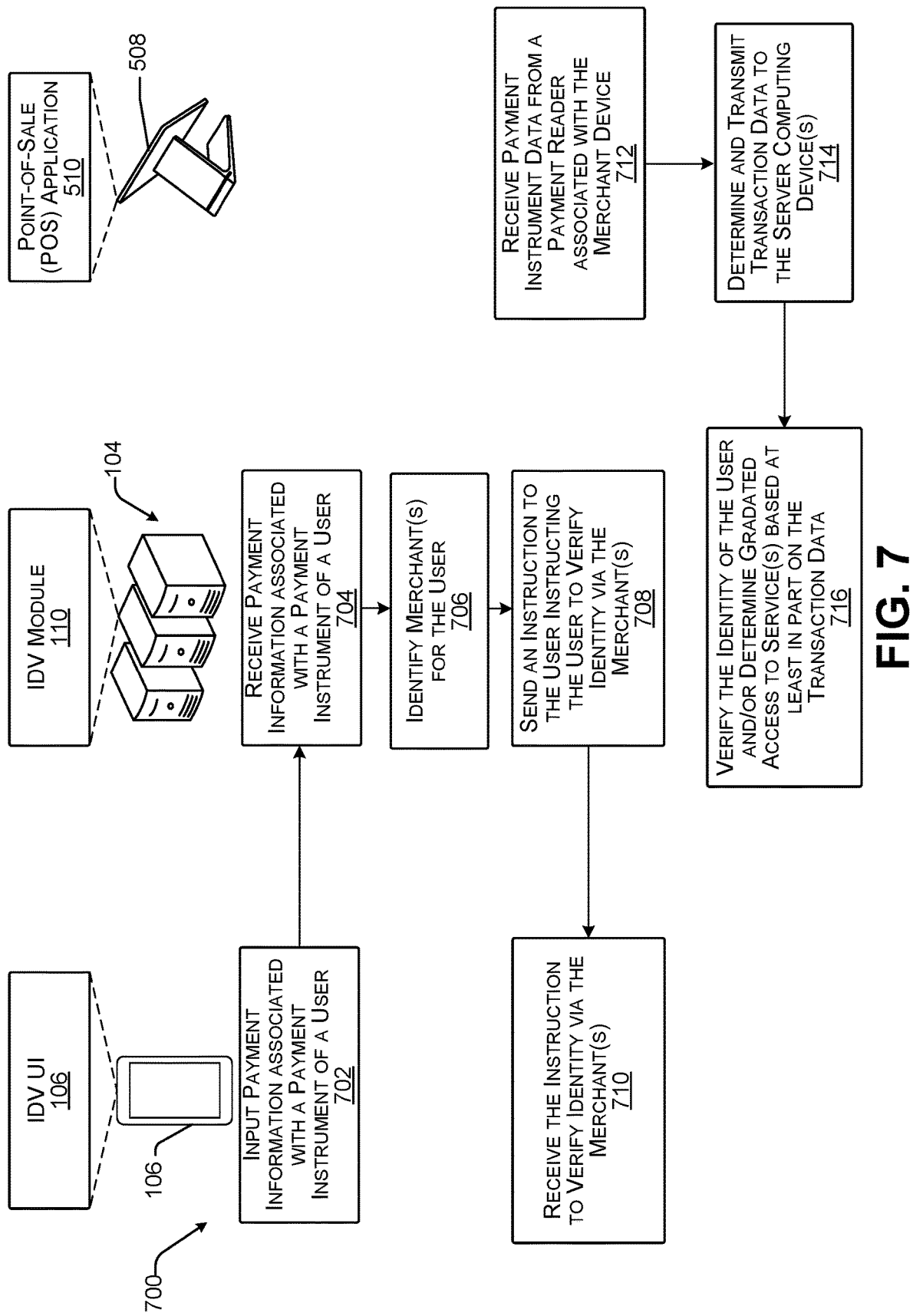
FIG. 7 illustrates an example process for verifying an identity of a user and/or determining gradated access to service(s) based at least in part on payment instrument data received from a merchant device of a merchant, as described herein.

FIG. 7 illustrates an example process 700 for verifying an identity of a user and/or determining gradated access to service(s) based at least in part on verification information received from a merchant device of a merchant, as described herein.

Block 702 illustrates inputting payment information associated with a payment instrument of a user. As described above, the user 102 can provide payment information to the server computing device(s) 104 via the IDV UI 108. In at least one example, the user 102 can provide the payment information responsive to a request for the payment information from the IDV module 110. Such payment information can include a number associated with a payment instrument, a verification value (e.g., PVKI, PVV, CVV, CVC, etc.) associated with the payment instrument, an expiration date associated with the payment instrument, etc. In at least one example, the IDV module 110 can receive the payment information, as illustrated in block 704.

Block 706 illustrates identifying merchant(s) for the user. In at least one example, the IDV module 110 can determine a list of one or more merchants for the user to verify its identity based on a characteristic of the one or more merchants. For example, the IDV module 110 can identify merchant(s) for the user by selecting one or more trusted merchants. That is, in at least one example, the IDV module 110 can determine a list of one or more merchants based on a characteristic of the one or more merchants (e.g., trusted). Furthermore, in some examples, merchants can be associated with a verification score (or other indicator), which can be based on their verification history. For instance, if a merchant has successfully identified a number of users above a threshold, the merchant can be associated with a verification score above a threshold. In some examples, the IDV module 110 can determine the list of one or more merchants based on the verification score. In additional or alternative examples, the IDV module 110 can determine the list of one or more merchants based on a location of the merchant(s) (e.g., relative to a location of a user). Additional or alternative characteristics can be used for identifying merchant(s) for the user.

In an additional or alternative example, the IDV module 110 can determine a list of one or more merchants based on a characteristic of the user 102. For instance, the IDV module 110 can determine a characteristic associated with the user 102 and can identify one or more merchants based at least in part on the characteristic.

The IDV module 110 can generate the list based at least in part on the one or more merchants that are identified. In some examples, a number of merchants comprising the list can be based on a characteristic of the merchant(s) and/or the user.

Block 708 illustrates sending an instruction to the user instructing the user to verify identity via the merchants. In at least one example, the IDV module 110 can send an instruction instructing the user 102 to interact with one or more merchants. In at least one example, the instruction can include a list comprising one or more merchants.

Block 710 illustrates receiving the instruction to verify identity via the merchant(s). In at least one example, the IDV user interface 108 can present the list of one or more merchants to the user 102, with an instruction to visit a particular number of the one or more merchants to verify their identity.

Block 712 illustrates receiving payment instrument data from a payment reader associated with the merchant device. In an additional or alternative example, the user 102 can visit a brick-and-mortar location of the merchant 506 and the merchant 506 may not know that the user 102 is visiting the merchant 506 for verification purposes. In such an example, the user 102 can participate in a transaction with the merchant 506 (e.g., to purchase or otherwise acquire goods or services from the merchant). The user 102 can present his or her payment instrument to the merchant 506 to satisfy a cost of the transaction. In at least one example, the user 102 can "present" his or her payment instrument such that the payment instrument interacts with the payment reader, for instance, via a dip, a tap, a swipe, or any other interaction that enables the payment reader to obtain the payment instrument data from the payment instrument. The payment reader can provide the payment instrument data to the POS application 510. As described above, the "payment instrument data" can include, but is not limited to a type (e.g., credit, debit, etc.) of a payment instrument, a number associated with a payment instrument, a verification value (e.g., PVKI, PVV, CVV, CVC, etc.) associated with a payment instrument, and/or an expiration date associated with the payment instrument.

Block 714 illustrates determining and transmitting transaction data to the server computing device(s). The POS application 510 can determine transaction data associated with the transaction, which can include but is not limited to, a name of the merchant, an address of the merchant, item(s) acquired via the transaction, payment instrument data, a PAN corresponding to the merchant, restrictions on what types of charges/debts can be made, etc. The POS application 510 can transmit the transaction data, which can include payment instrument data, to the server computing device(s) 104. As described above, in at least one example, the transaction data can comprise verification information 514.

Block 716 illustrates verifying the identity of the user and/or determining gradated access to service(s) based at least in part on the transaction data. In at least one example, the IDV module 110 can receive the transaction data and can analyze the transaction data to verify the identity of the user 102 and/or determine gradated access to service(s) for the user 102.

In at least one example, the IDV module 110 can analyze the payment instrument data associated with the transaction data to determine whether the payment instrument data corresponds to payment information provided by the user 102. That is, the IDV module 110 can compare the payment instrument data received from the POS application 510 with previously received payment information to determine whether the payment instrument data corresponds to any previously received payment information. If the payment instrument data corresponds to previously received payment information, the IDV module 110 can determine whether the merchant associated with the transaction is a merchant suggested for the user 102.

Based at least in part on determining that (i) the payment instrument data corresponds to previously received payment information and (ii) the merchant associated with the transaction (e.g., the merchant providing the transaction data) is a merchant suggested for the corresponding user, the IDV module 110 can verify the identity of the user 102 and/or determine gradated access to service(s) for the user 102. In at least one example, the IDV module 110 can determine a score associated with a factor in an IDV path as described above with reference to FIG. 1. The score can be used to verify the identity of the user and/or determine gradated access to services, as described above.

Figure 8:
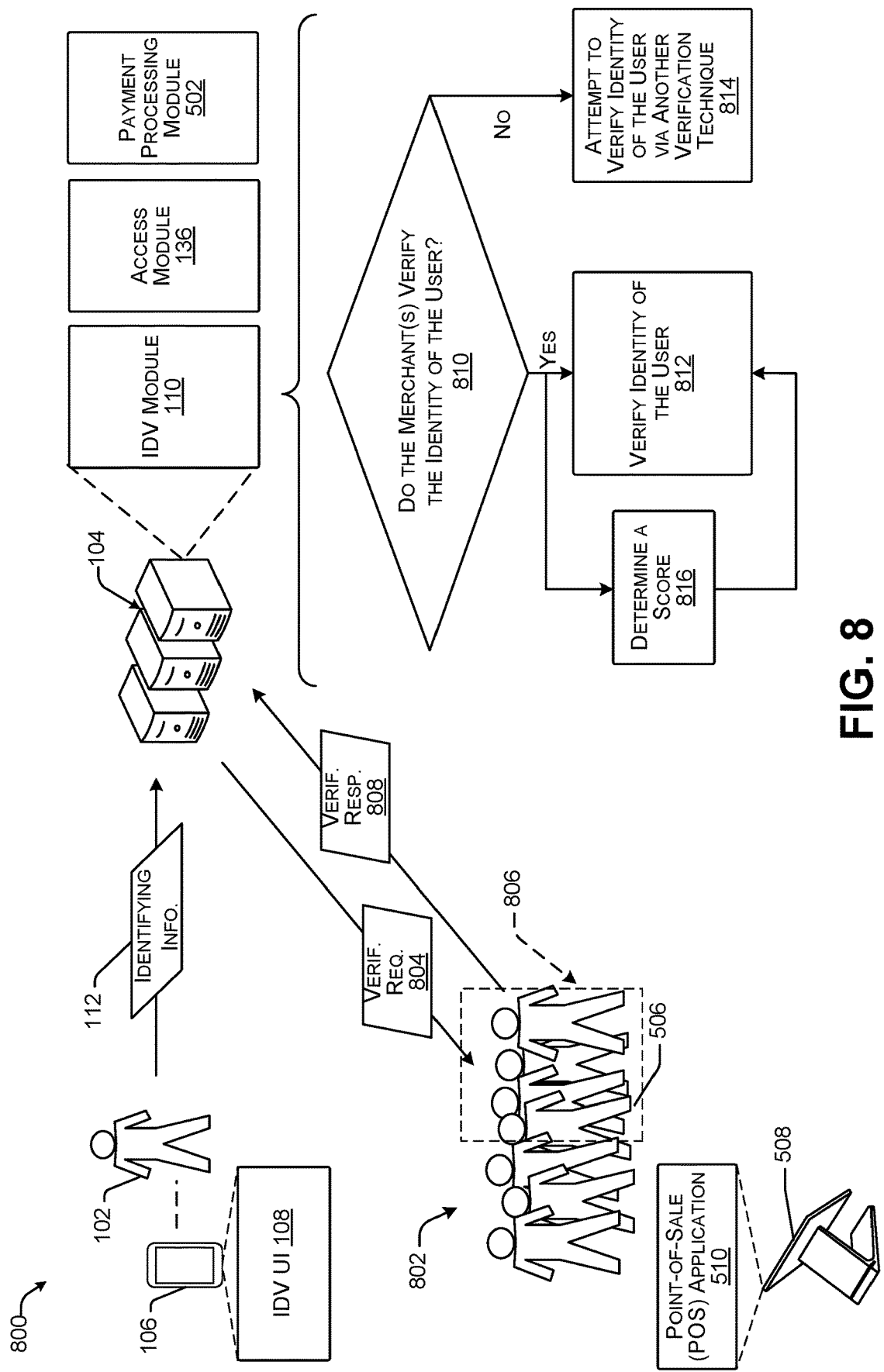
FIG. 8 illustrates an example environment for, among other things, verifying an identity of a user via a merchant platform comprising a plurality of distributed merchants, as described herein.

FIG. 8 illustrates an example environment 800 for, among other things, verifying an identity of a user via a merchant platform comprising a plurality of distributed merchants, as described herein. In at least one example, a merchant platform can be used as a referral system for verifying identities of users.

The example environment 800 can include aspects of the example environment described above with reference to FIGS. 1 and 5. For instance, the example environment 800 can include a user 102 that can communicate with the server computing device(s) 104 via a device 106. The device 106 can present an IDV UI 108, which can facilitate the interactions between the user 102 and the service provider associated with the server computing device(s) 104. For instance, the user 102 can provide identifying information 112 to the server computing device(s) 104 via the IDV UI 108.

In at least one example, the server computing device(s) 104 can be associated with one or more functional components, as described above. In at least one example, one of the functional components can be the IDV module 110, the access module 136, and the payment processing module 502, as described above.

As described above with reference to FIG. 5, in at least one example, the service provider associated with the server computing device(s) 104 can provide payment processing services in addition to, or as an alternative of, identity verification services. The service provider can provide payment processing services to a plurality of different, disparately located merchants 802. The plurality of different, disparately located merchants 802 can include the merchant 506, referenced above with reference to FIG. 5. Similarly, each of the merchants 802 can be associated with merchant devices. Each merchant device can have an instance of a POS application stored thereon. For clarity, only the merchant device 508 and the POS application 510 are illustrated in FIG. 8, but each of the merchants 802 can be associated with their own merchant device, as described above.

In at least one example, the IDV module 110 can transmit verification request(s) 804 to one or more of the merchants 802. The verification request(s) 804 can be a text message, email, push notification, and the like. In at least one example, the IDV module 110 can select a subset 806 of the merchants 802 to send the verification request(s) 804. In at least one example, the subset 806 of the merchants 802 can be trusted merchants such that the service provider has verified the reliability of the trusted merchants.

In an additional or alternative example, the subset 806 of the merchants 802 can be selected based on a characteristic of the user 102. That is, the IDV module 110 can determine characteristic(s) of the user 102 based at least in part on the identifying information 112 and can select the subset 806 of merchants 802 based at least in part on the characteristic(s) of the user 102. For instance, the IDV module 110 can determine a geolocation of the user 102 (e.g., based on the identifying information 112, a GPS location associated with the device 106, etc.) and can select the subset 806 of the merchants 802 based at least in part on the geolocation of the user 102. As an example, the subset 806 of the merchants 802 can be located within a threshold distance of the geolocation of the user 102. In an example where the IDV module 110 can access transaction history associated with the user 102, the IDV module 110 can determine the subset 806 of the merchants 802 based at least in part on merchants with whom the user 102 has previously interacted, merchants having merchant category codes (MCCs) similar to merchants with whom the user 102 has previously interacted, merchants having inventory that is similar to item(s) the user 102 has previously purchased, and so on.

Furthermore, in at least one example, the subset 806 of merchants 802 can be identified by the user 102 in association with providing identifying information 112 to the IDV module 110 and/or in association with a request to access services of the service provider.

The verification request(s) 804 can prompt the receiving merchant(s) to indicate whether they know the user 102, information associated with the user 102, and the like. In at least one example, the receiving merchant(s) can respond to the verification request(s) 804 via verification response(s) 808. In some examples, a verification response 808 can include an indication as to whether a merchant of the subset 806 knowns the user 102. For instance, a merchant may know a user based on an employment history, a transaction history, or the like. In additional or alternative examples, a verification response 808 can include additional information regarding how well a merchant knows the user 102, whether the merchant believes the user 102 is trustworthy, and the like. Further, in at least one example, a verification response 808 can include information about the user 102, as known by the merchant. For instance, such information may include a date of birth, a phone number, an email address, etc.

In at least one example, the IDV module 110 can receive the verification response(s) 808 and can determine whether the subset 806 of merchant(s) 802 verify the identity of the user, as illustrated in block 810. That is, the IDV module 110 can analyze the verification response(s) 808 to determine whether the merchant(s) in the subset 806 indicated that they know the user 102 and/or how the merchant(s) in the subset 806 know the user 102. In some examples, the IDV module 110 can determine whether more than a threshold number of merchant(s) in the subset 806 verify the identity of the user 102 to determine whether the merchant(s) in the subset 806 verify the identity of the user 102. If more than the threshold number of merchant(s) in the subset verify the identity of the user 102, the IDV module 110 can verify the identity of the user 102, as illustrated in block 812. That is, if the number of verification response(s) 808 received from the subset 802 of merchants(s) 806 satisfies the threshold, the IDV module 110 can verify the identity of the user 102, as illustrated in block 812. However, if less than the threshold number of merchant(s) in the subset verify the identity of the user 102, the IDV module 110 can attempt to verify the identity of the user 102 via another verification technique, as illustrated in block 814. That is, if the number of verification response(s) 808 received from the subset 802 of merchants(s) 806 does not satisfy the threshold, the IDV module 110 can attempt to verify the identity of the user 102 via another verification technique, as illustrated in block 814. In some examples, additionally or alternative information associated with the verification response(s) 808 can be considered in determining whether to verify the identity of the user 102 (or not).

In some examples, the IDV module 110 can determine a score which can be used to verify the identity of the user 102, as illustrated in block 816. That is, techniques described in FIG. 8 can be associated with a factor in an IDV path. In at least one example, the score can be based on a number of merchants that responded, responses from the merchants, and so on. As such, the IDV module 110 can determine a score associated with the factor which can be used individually or aggregated with one or more other scores (associated with other factors) to verify the identity of the user 102.

While FIGS. 5-8 are described above with reference to a merchant platform, techniques described below can be applicable to any distributed network of users associated with services of a service provider. That is, techniques described herein can utilize any community of users (e.g., delivery service users, peer-to-peer payment service users, payment processing service users, and so on) to verify the identity of other users. In such examples, any individual in need of IDV can interact with one or more verifying entities. The verifying entity(s) can be merchants, as described above, or any other user in a community of users. For instance, a verifying entity can be another user in a peer-to-peer payment service, a courier in a delivery service, and so on. In at least one example, verifying entities can be selected based on characteristics of the verifying entities and/or user, as described above. For instance, verifying entities can be selected based on risk associated with individual verifying entities and/or location. In some examples, a number of verifying entities required for a particular user can be based on characteristics of the verifying entities and/or the user. For example, a user may be required to verify with a larger number of verifying entities associated with lower verification scores (versus a smaller number of verifying entities associated with higher verification scores). The verifying entities can perform many of the same verification techniques described above. For example, a verifying entity can capture images of legally verifying documents, indicate a physical presence of a user, etc. via an application executing on a computing device of the verifying entity. As a result, the IDV module 110 can verify the identity of the user via interactions between the verifying entity and the user.

Figure 9:
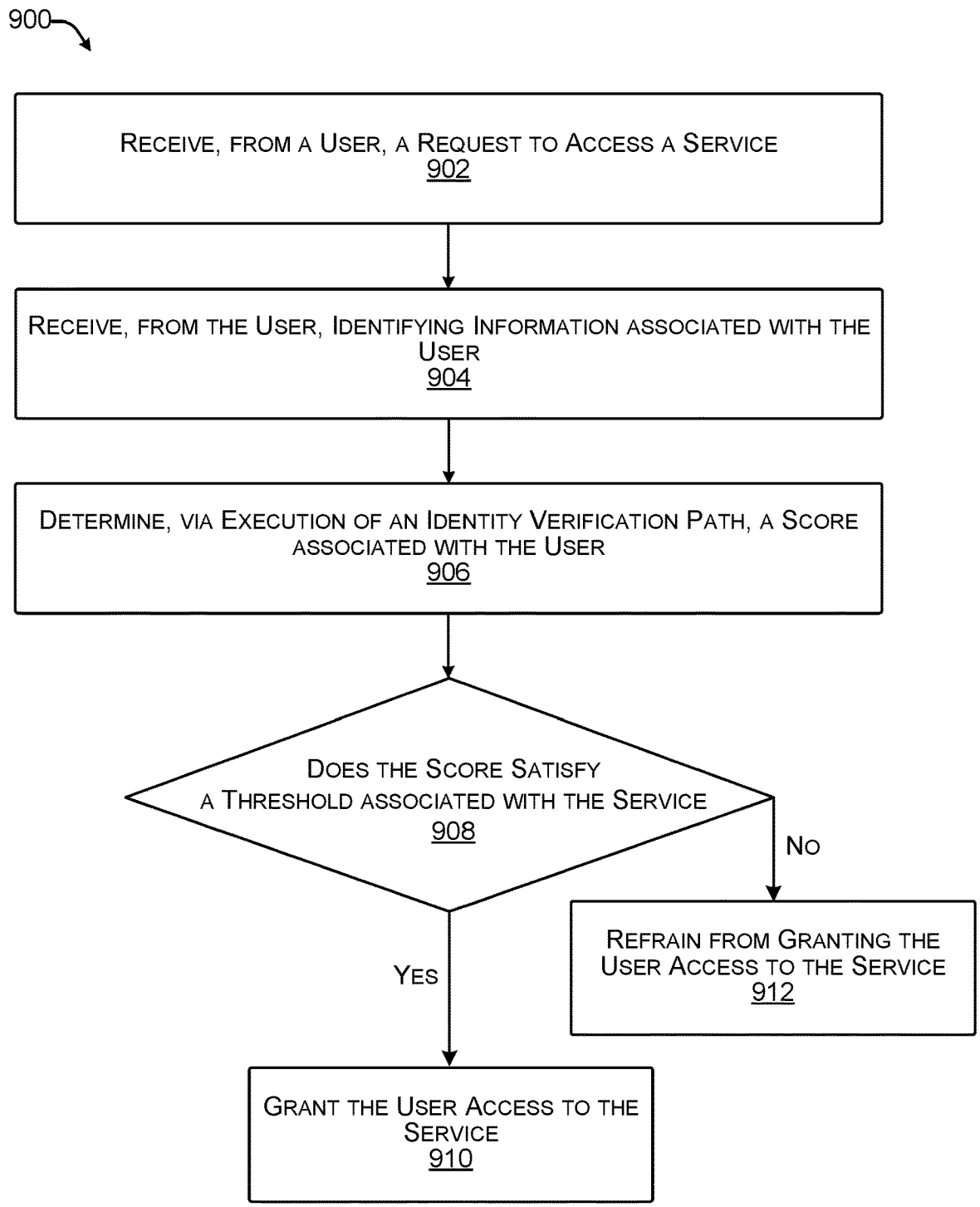
FIG. 9 illustrates an example process for granting a user access to a service based on an IDV process, as described herein.

FIG. 9 illustrates an example process 900 for granting a user access to a service based on an IDV process, as described herein.

Block 902 illustrates receiving, from a user, a request to access a service of a service provider. In at least one example, the user 102 can request to access a service provided by a service provider. That is, the user 102 can submit a request, for instance via the device 106, to access a peer-to-peer payment service, a payment processing service, a financing service, an inventory management service, or the like. In some examples, the request can be submitted in association with an onboarding process (e.g., to onboard the user 102 to a platform for accessing services of the service provider).

Block 904 illustrates receiving, from the user, identifying information associated with the user. In at least one example, the user 102 can provide identifying information 112 in association with the request, for example via the IDV UI 108. In some examples, the identifying information 112 can be PII. The identifying information 112 can additionally or alternatively include other information (that may or may not be PII) that can be used to identify the user 102. In some examples, if the user 102 is a merchant (e.g., an entity providing goods or services to others), the identifying information 112 can be associated with information that can be used to identify the merchant (e.g., business name, tax identification number (e.g., an Employer Identification Number (EIN), etc.).

Block 906 illustrates determining, via execution of an IDV path, a score associated with a user. In at least one example, the IDV module 110 can utilize an IDV path of a plurality of IDV paths for verifying an identity of a user 102. Each of the IDV paths can be multi-dimensional processes using one or more factors to determine a score (or other indicator) representative of (i) whether identifying information provided by a user accurately identifies the user and/or (ii) a confidence value indicating how confident the IDV module 110 is that the user 102 is accurately identified. In some examples, instructions for implementing individual IDV paths can be stored in association with the server computing device(s) 104. In other examples, instructions for implementing individual IDV paths can be generated responsive to determining that identifying information provided by a user is insufficient to verify the identity of the user. That is, in additional or alternative examples, instructions for implementing individual IDV paths can be generated in near-real-time. As described below, the factor(s) and order of presenting/performing the factor(s) can be determined using a machine-trained model. That is, the IDV module 110 can utilize a machine-trained model, as described above with reference to FIG. 2, to select, or otherwise determine, which IDV path to implement for verifying the identity of the user 102. In some examples, the selected IDV path can be selected based on characteristics of the user 102, the service associated with the request, context associated with the request, etc.

The IDV module 110 can implement the IDV path to determine a score associated with the user 102. Additional details associated with the factors and/or executing an IDV path are described above with reference to FIG. 1.

Block 908 illustrates determining whether a score satisfies a threshold associated with the service. In at least one example, the score 130 can be used to determine gradated access to service(s) of the service provider. As described above, services can be "gradated" in that different services can be provided to different users and/or groups of users based on scores output from the IDV paths. In at least one example, the access module 136 can compare the score to a threshold. The threshold can be particular to the service for which access is requested. Based at least in part on determining that the score satisfies the threshold, the access module 136 can grant the user access to the service, as illustrated in block 910. That is, the access module 136 can compare the score to the threshold to determine whether the score meets or exceeds the threshold. If the score meets or exceeds the threshold, the access module 136 can grant the user 102 access to the service. In at least one example, the access module 136 can grant the user 102 access to the service by associating an indication (e.g., a flag, a mapping, etc.) with a user profile of the user 102 that indicates that the user profile is permitted access to the service. Based at least in part on determining that the score does not satisfy the threshold, the access module 136 can refrain from granting the user access to the service, as illustrated in block 912. That is, the access module 136 can compare the score to the threshold to determine whether the score meets or exceeds the threshold. If the score does not meet or exceed the threshold, the access module 136 can deny the user 102 access to the service.

Figure 10:
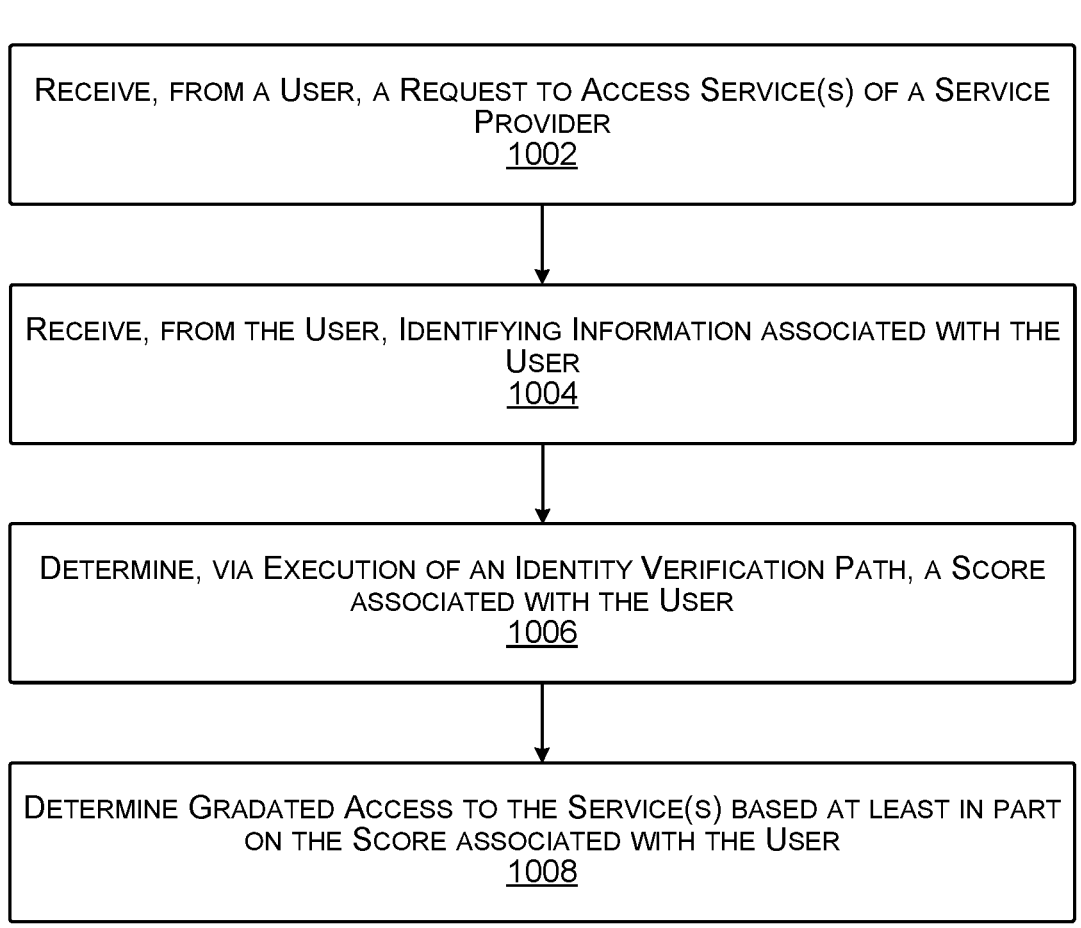
FIG. 10 illustrates an example process for determining gradated access to one or more services based on an IDV process, as described herein.

FIG. 10 illustrates an example process 1000 for determining gradated access to one or more services based on an IDV process, as described herein.

Block 1002 illustrates receiving, from a user, a request to access service(s) of a service provider. In at least one example, the user 102 can request to access one or more services provided by a service provider. That is, the user 102 can submit a request, for instance via the device 106, to access a peer-to-peer payment service, a payment processing service, a financing service, an inventory management service, or the like. In some examples, the request can be submitted in association with an onboarding process (e.g., to onboard the user 102 to a platform for accessing services of the service provider).

Block 1004 illustrates receiving, from the user, identifying information associated with the user. In at least one example, the user 102 can provide identifying information 112 in association with the request, for example via the IDV UI 108. In some examples, the identifying information 112 can be PII. The identifying information 112 can additionally or alternatively include other information (that may or may not be PII) that can be used to identify the user 102. In some examples, if the user 102 is a merchant (e.g., an entity providing goods or services to others), the identifying information 112 can be associated with information that can be used to identify the merchant (e.g., business name, tax identification number (e.g., an Employer Identification Number (EIN), etc.).

Block 1006 illustrates determining, via execution of an IDV path, a score associated with a user. In at least one example, the IDV module 110 can utilize an IDV path of a plurality of IDV paths for verifying an identity of a user. Each of the IDV paths can be multi-dimensional processing using one or more factors to determine a score (or other indicator) representative of (i) whether identifying information provided by a user accurately identifies the user and/or (ii) a confidence value indicating how confident the IDV module 110 is that the user 102 is accurately identified. In some examples, instructions for implementing individual IDV paths can be stored in association with the server computing device(s) 104. In other examples, instructions for implementing individual IDV paths can be generated responsive to determining that identifying information provided by a user is insufficient to verify the identity of the user. That is, in additional or alternative examples, instructions for implementing individual IDV paths can be generated in near-real-time. As described below, the factor(s) and order of presenting/performing the factor(s) can be determined using a machine-trained model. That is, the IDV module 110 can utilize a machine-trained model, as described above with reference to FIG. 2, to select, or otherwise determine, which IDV path to implement for verifying the identity of the user 102. In some examples, the selected IDV path can be selected based on characteristics of the user 102, the service associated with the request, context associated with the request, etc.

The IDV module 110 can implement the IDV path to determine a score associated with the user 102. Additional details associated with the factors and/or executing an IDV path are described above with reference to FIG. 1.

Block 1008 illustrates determining gradated access to the service(s) based at least in part on the score associated with the user. In at least one example, the access module 136 can utilize the score to determine (i) types of services available to the user 102, (ii) levels of services available to the user 102, (iii) terms associated with services that are available to the user 102, and so on.

As described above, the access module 136 can utilize the score to determine types of services available to the user 102. That is, the types of service(s) accessible to users can be gradated based on scores output from IDV paths. For instance, in some examples, if the score meets or exceeds a threshold, or is associated with a particular range, the access module 136 can enable the user 102 to access one or more services that are accessible to users with scores that satisfy the threshold and/or are associated with the particular range. As an example, the access module 136 can enable the user 102 to access high-risk services (e.g., high-risk to a service provider), such as lending funds to the user 102, same-day payroll deposits, etc. Alternatively, if the score does not meet or exceed the threshold, or is associated with a different range, the access module 136 can enable the user 102 to access one or more services that are accessible to users with scores that do not satisfy the threshold and/or are associated with the different range. As an example, if the score does not meet or exceed the threshold, or is associated with a different range, the access module 136 can enable the user 102 to access low-risk services (e.g., low-risk to a service provider), such as payment processing services, daily payroll deposits, etc. While a single threshold and two ranges are described, multiple thresholds and/or ranges can be used, wherein each threshold and/or range of scores can be associated with different available services. In some examples, an individual service can be associated with its own threshold and/or own range of scores.

In at least one example, the access module 136 can utilize the score to determine levels of services available to the user 102. That is, levels of service(s) can be gradated based on scores output from IDV paths. For instance, in some examples, if the score meets or exceeds a threshold, or is associated with a particular range, the access module 136 can enable the user 102 to access a level of service that is accessible to users with scores that satisfy the threshold and/or are associated with the particular range. As an example, the access module 136 can enable the user 102 to access premium features of a service (e.g., a "premium" or "high" level of service) based on the score. Alternatively, if the score does not meet or exceed the threshold, or is associated with a different range, the access module 136 can enable the user 102 to access a level of service that is accessible to users with scores that do not satisfy the threshold and/or are associated with the different range. As an example, if the score does not meet or exceed the threshold, or is associated with a different range, the access module 136 can enable the user 102 to access a lower level of service (e.g., a "standard" or "substandard" level of service). While a single threshold and two ranges are described, multiple thresholds and/or ranges can be used, wherein each threshold and/or range of scores can be associated with different levels of services.

In at least one example, the access module 136 can utilize the score to determine terms associated with services that are available to the user 102. That is, the terms by which service(s) are provided can be gradated based on scores output from IDV paths. For instance, in some examples, if the score meets or exceeds a threshold, or is associated with a particular range, the access module 136 can enable the user 102 to access a service via terms that are applicable to users with scores that satisfy the threshold and/or are associated with the particular range. As an example, the access module 136 can enable the user 102 to access a service with more favorable terms than another user that has a lower score. Alternatively, if the score does not meet or exceed the threshold, or is associated with a different range, the access module 136 can enable the user 102 to access a service via terms that are applicable to users with scores that do not satisfy the threshold and/or are associated with the different range. As an example, if the score does not meet or exceed the threshold, or is associated with a different range, the access module 136 can enable the user 102 to access a service with less favorable terms than another user that has a higher score. While a single threshold and two ranges are described, multiple thresholds and/or ranges can be used, wherein each threshold and/or range of scores can be associated with different service terms.

Figure 11:
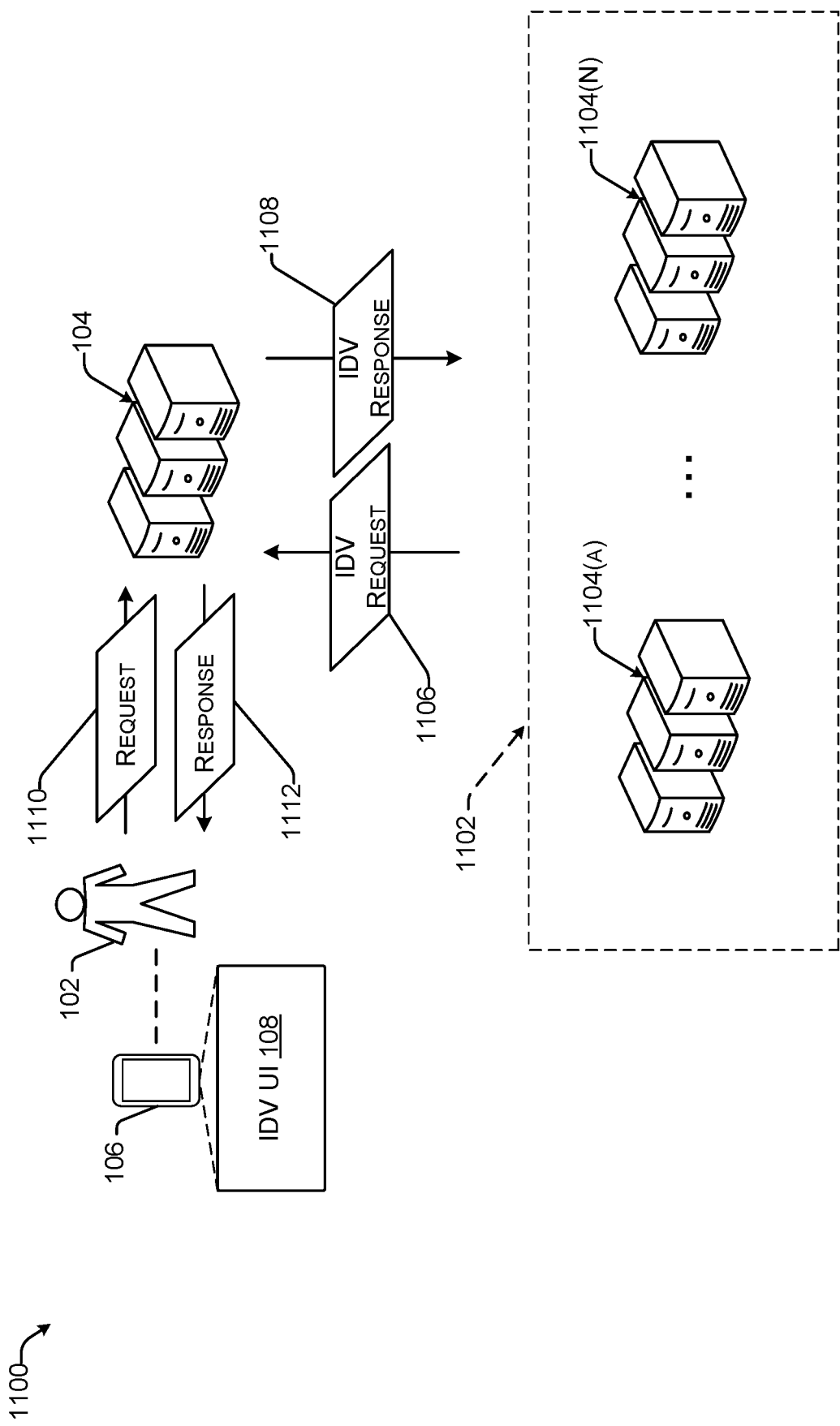
FIG. 11 illustrates an example IDV system operating for the benefit of multiple service providers, as described herein.

While FIGS. 9 and 10 above describe receiving a request to access service(s) from a user, in an additional or alternative example, the server computing device(s) 104 can offer IDV services for the benefit of other service providers, as illustrated in FIG. 11. That is, FIG. 11 illustrates an example IDV system 1100 operating for the benefit of multiple service providers, as described herein. The system 1100 illustrates the server computing device(s) 104, which can communicate with one or more requestors 1102. The requestor(s) 1102 can include third-party service providers, which are represented by server computing device(s) 1104(A)-1104(N). In at least one example, the third-party service providers can subscribe to, or otherwise access, IDV services provided by the server computing device(s) 104. That is, in some examples, the third-party service providers can be subscribers of the IDV services. In additional or alternative examples, the third-party service providers may not subscribe to the IDV services, but may otherwise access the IDV services on an as-needed basis.

In at least one example, a requestor 1102 can send an IDV request 1106 to the server computing device(s) 104, for example, via an API. In some examples, the IDV request 1106 can include identifying information associated with a user to whom the request pertains. The server computing device(s) 104 can perform one or more IDV techniques as described in FIGS. 1-10 responsive to receiving the IDV request 1106. In some examples, where additional or alternative information is required to perform the one or more IDV techniques, the server computing device(s) 104 can request such additional or alternative information via the requestor 1102, for example, via an API. Based at least in part on performing IDV technique(s) described above, the server computing device(s) 104 can send an IDV response 1108 to the requestor 1102. In some examples, the IDV response 118 can include a score, which can be used by the requestor 1102 to determine gradated access to services offered by the respective third-party service provider. In an additional or alternative example, the IDV response 118 can include an indication of whether the identity of the user associated with the IDV request 1106 is verified or not (by the server computing device(s) 104).

Further, the server computing device(s) 104 can perform one or more IDV techniques responsive to receiving a request 1110 to access service(s) associated with the service provider, as described above. In at least one example, the user 102 can submit the request 1110, for instance via the device 106, to access a peer-to-peer payment service, a payment processing service, a financing service, an inventory management service, or the like. In some examples, the request 1110 can be submitted in association with an onboarding process (e.g., to onboard the user 102 to a platform for accessing services of the service provider). The server computing device(s) 104 can perform one or more IDV techniques as described in FIGS. 1-10 responsive to receiving the request 1110. The server computing device(s) 104 can send a response 1112 to the device 106 operable by the user 102. The response 1112 can indicate one or more services to which the user 102 has been granted access, levels of service granted, terms of services granted, etc. In some examples, the response 1112 can be a declination of services, for instance, if the user 102 cannot be verified via IDV techniques described herein.

Figure 12:
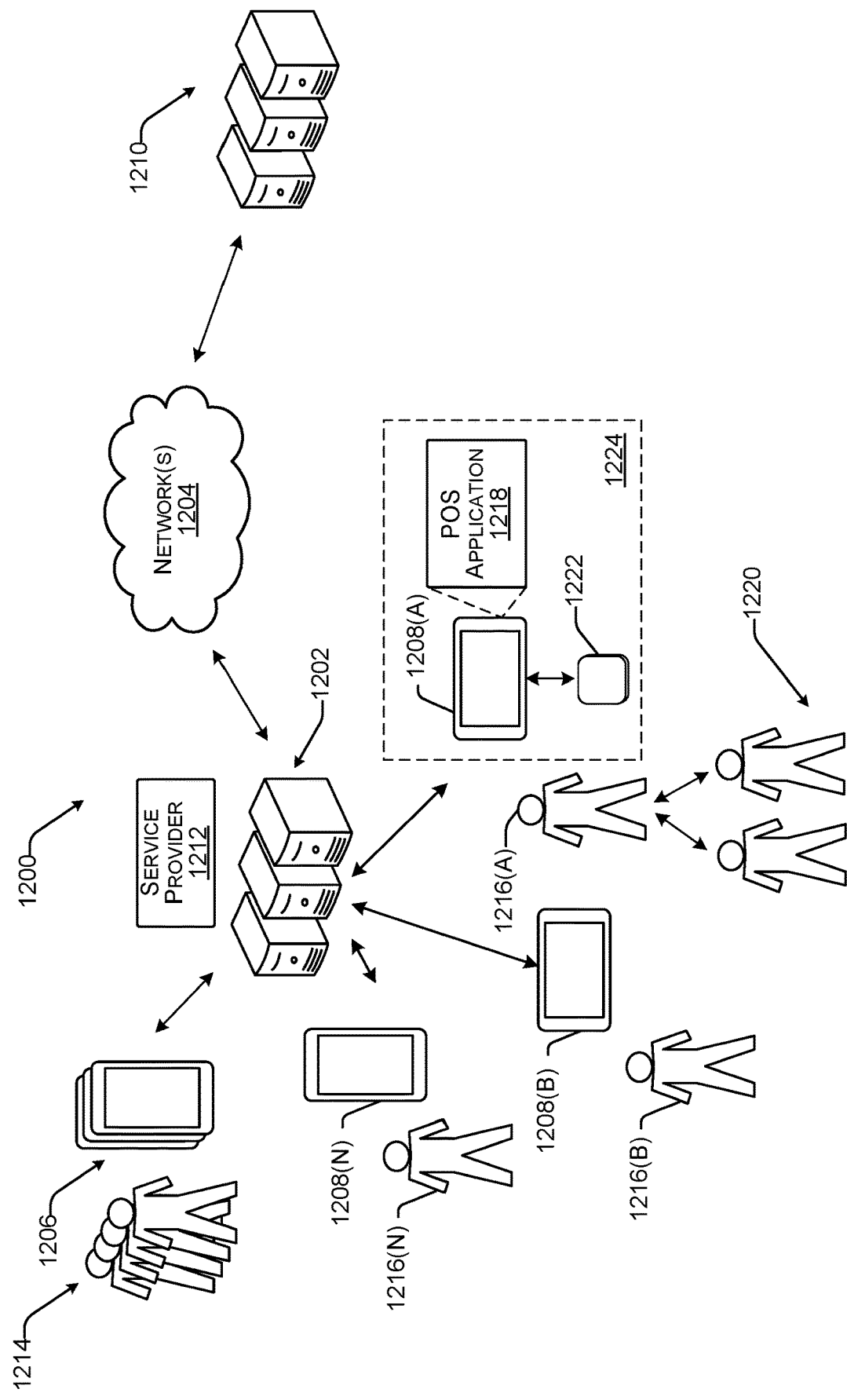
FIG. 12 illustrates an example merchant ecosystem for facilitating, among other things, techniques described herein.

FIG. 12 illustrates an example environment 1200. The environment 1200 includes server computing device(s) 1202 that can communicate over a network 1204 with user devices 1206 (which, in some examples can be merchant devices 1208 (individually, 1208(A)-1208(N))) and/or server computing device(s) 1210 associated with third-party service provider(s). The server computing device(s) 1202 can be associated with a service provider 1212 that can provide one or more services for the benefit of users 1214, as described below. Actions attributed to the service provider 1212 can be performed by the server computing device(s) 1202.

The environment 1200 can include a plurality of user devices 1208, as described above. The plurality of user devices 1208 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual of the user devices can be operable by users 1214. The users 1214 can be referred to as customers, buyers, merchants, sellers, borrowers, employees, employers, payor, payee, and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider 1212 or which can be an otherwise dedicated application. In at least one example, a user 1214 can interact with the user interface via touch input, spoken input, or any other type of input.

As described above, in at least one example, the users 1214 can include merchants 1216 (individually, 1216(A)-1216(N)). In an example, the merchants 1216 can operate respective merchant devices 1208, which can be user devices 1206 configured for use by merchants 1216. For the purpose of this discussion, a "merchant" can be any entity that offers items (e.g., goods or services) for purchase or other means of acquisition (e.g., rent, borrow, barter, etc.). The merchants 1216 can offer items for purchase or other means of acquisition via brick-and-mortar stores, mobile stores (e.g., pop-up shops, food trucks, etc.), online stores, combinations of the foregoing, and so forth. In some examples, at least some of the merchants 1216 can be associated with a same entity but can have different merchant locations and/or can have franchise/franchisee relationships. In additional or alternative examples, the merchants 1216 can be different merchants. That is, in at least one example, the merchant 1216(A) is a different merchant than the merchant 1216(B) and/or the merchant 1216(C).

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, employer identification numbers (EIN)s, lines of business (in some examples), inventories (or at least portions thereof), and/or the like. That is, the use of the term "different merchants" does not refer to a merchant with various merchant locations or franchise/franchisee relationships.

Each merchant device 1208 can have an instance of a POS application 1218 stored thereon. The POS application 1218 can configure the merchant device 1208 as a POS terminal, which enables the merchant 1216(A) to interact with one or more customers 1220. As described above, the users 1214 can include customers, such as the customers 1220 shown as interacting with the merchant 1216(A). For the purpose of this discussion, a "customer" can be any entity that acquires items from merchants. While only two customers 1220 are illustrated in FIG. 12, any number of customers 1220 can interact with the merchants 1216. Further, while FIG. 12 illustrates the customers 1220 interacting with the merchant 1216(A), the customers 1220 can interact with any of the merchants 1216.

In at least one example, interactions between the customers 1220 and the merchants 1216 that involve the exchange of funds (from the customers 1220) for items (from the merchants 1216) can be referred to as "POS transactions" and/or "transactions." In at least one example, the POS application 1218 can determine transaction data associated with the POS transactions. Transaction data can include payment information, which can be obtained from a reader device 1222 associated with the merchant device 1208(A), user authentication data, purchase amount information, point-of-purchase information (e.g., item(s) purchased, date of purchase, time of purchase, etc.), etc. The POS application 1218 can send transaction data to the server computing device(s) 1202. Furthermore, the POS application 1218 can present a UI to enable the merchant 1216(A) to interact with the POS application 1218 and/or the service provider 1212 via the POS application 1218.

In at least one example, the merchant device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication based payment instruments, and the like, as described below. In some examples, the reader device 1222 can read information from alternative payment instruments including, but not limited to, wristbands and the like.

The POS terminal can be paired with a reader device 1222 to comprise a POS system 1224. The reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the reader device 1222, and communicate with the server computing device(s) 1202, which can provide, among other services, a payment processing service. The service provider 1212 can communicate with server computing device(s) 1210, as described below. In this manner, the POS terminal and reader device 1222 may collectively process transaction(s) between the merchants 1216 and customers 1220.

While, the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the customers 1220. In additional or alternative examples, the POS terminal can have a display integrated therein for presenting information to the customers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a customer 1220 and his or her payment instrument are physically present at the time of the transaction. Card-present transactions may be processed by swipes, dips, taps, or any other interaction between a physical payment instrument (e.g., a card) and a reader device 1222 whereby the reader device 1222 is able to obtain payment data from the payment instrument. A swipe is a card-present transaction where a customer 1220 slides a card, or other payment instrument, having a magnetic strip through a reader device 1222 that captures payment data contained in the magnetic strip. A dip is a card-present transaction where a customer 1220 inserts a payment instrument having an embedded microchip (i.e., chip) into a reader device 1222 chip-side first. The other payment instrument remains in the payment reader until the reader device 1222 prompts the customer 1220 to remove the card, or other payment instrument. While the payment instrument is in the reader device 1222, the microchip creates a one-time code which is sent from the POS system 1224 to the server computing device(s) 1210 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where neither the customer 1220 nor the card, or other payment instrument, are physically present at the POS and payment data is required to be manually keyed in (e.g., by a merchant, customer, etc.) to complete the transaction.

The POS system 1224, the server computing device(s) 1202, and/or the server computing device(s) 1210 may exchange payment information and transaction data to determine whether transactions are authorized. For example, the POS system 120 may provide encrypted payment data, user authentication data, purchase amount information, point-of-purchase information, etc. (collectively, transaction data) to server computing device(s) 1202 over the network(s) 1204. The server computing device(s) 1202 may send the transaction data to the server computing device(s) 1210. As described above, in at least one example, the server computing device(s) 1210 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1210 associated therewith) can send a fund transfer request to a server computing device of a card payment network (e.g., Mastercard®, VISA®, etc.) to determine whether the transaction is authorized or deficient. In at least one example, the service provider 1212 can serve as an acquirer and connect directly with the card payment network.

The card payment network (e.g., the server computing device(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1210 associated therewith) can make a determination as to whether the customer has the capacity to absorb the relevant charge associated with the payment transaction. In at least one example, the service provider 1212 can serve as an issuer and/or can partner with an issuer. The transaction is either approved or rejected by the issuer and/or the card payment network (e.g., the server computing device(s) 1210 associated therewith), and a payment authorization message is communicated from the issuer to the POS device via a path opposite of that described above.

As described above, the server computing device(s) 1210, which can be associated with payment service provider(s), may determine whether the transaction is authorized based on the transaction data, as well as information relating to parties to the transaction (e.g., the customer 1220 and/or the merchant 1216(A)). The server computing device(s) 1210 may send an authorization notification over the network(s) 1204 to the server computing device(s) 1202, which may send the authorization notification to the POS system 1224 over the network(s) 1204 to indicate whether the transaction is authorized. The server computing device(s) 1202 may also transmit additional information such as transaction identifiers to the POS system 1224. In one example, the server computing device(s) 1202 may include a merchant application and/or other functional components for communicating with the POS system 1224 and/or the server computing device(s) 1210 to authorize or decline transactions.

Based on the authentication notification that is received by the POS system 1224 from server computing device(s) 1210, the merchant 1216(A) may indicate to the customer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1212 can provide, among other services, payment processing services, inventory management services, catalog management services, business banking services, financing services, web-development services, payroll services, employee management services, appointment services, restaurant management services, order management services, delivery services, peer-to-peer payment services, onboarding services, identity verification (IDV) services, and so on. In some examples, the users 1214 can access all of the services of the service provider 1212. In other examples, the users 1214 can have gradated access to the services, which can be based on risk tolerance, IDV outputs, subscriptions, and so on. In at least one example, access to such services can be availed to the merchants 1216 via the POS application 1218. In additional or alternative examples, each service can be associated with its own access point (e.g., application, web browser, etc.).

The service provider 1212 can offer payment processing services for processing payments on behalf of the merchants 1216, as described above. For example, the service provider 1212 can provision payment processing software, payment processing hardware and/or payment processing services to merchants 1216, as described above, to enable the merchants 1216 to receive payments from the customers 1220 when conducting POS transactions with the customers 1220. For instance, the service provider 1212 can enable the merchants 1216 to receive cash payments, payment card payments, and/or electronic payments from customers 1220 for POS transactions and the service provider 1212 can process transactions on behalf of the merchants 1216.

As the service provider 1212 processes transactions on behalf of the merchants 1216, the service provider 1212 can maintain accounts or balances for the merchants 1216 in one or more ledgers. For example, the service provider 1212 can analyze transaction data received for a transaction to determine an amount of funds owed to a merchant 1216(A) for the transaction. In at least one example, such an amount can be a total purchase price less fees charged by the service provider 1212 for providing the payment processing services. Based on determining the amount of funds owed to the merchant 1216(A), the service provider 1212 can deposit funds into an account of the merchant 1216(A). The account can have a stored balance, which can be managed by the service provider 1212. The account can be different from a conventional bank account at least because the stored balance is managed by a ledger of the service provider 1212 and the associated funds are accessible via various withdrawal channels including, but not limited to, scheduled deposit, same-day deposit, instant deposit, and a linked payment instrument.

A scheduled deposit can occur when the service provider 1212 transfers funds associated with a stored balance of the merchant 1216(A) to a bank account of the merchant 1216(A) that is held at a bank or other financial institution (e.g., associated with the server computing device(s) 1210). Scheduled deposits can occur at a prearranged time after a POS transaction is funded, which can be a business day after the POS transaction occurred or later. In some examples, the merchant 1216(A) can access funds prior to a scheduled deposit. For instance, the merchant 1216(A) may have access to same-day deposits (e.g., wherein the service provider 1212 deposits funds from the stored balance to a linked bank account of the merchant on a same day as POS transaction, in some examples prior to the POS transaction being funded) or instant deposits (e.g., wherein the service provider 1212 deposits funds from the stored balance to a linked bank account of the merchant on demand, such as responsive to a request). Further, in at least one example, the merchant 1216(A) can have a payment instrument that is linked to the stored balance that enables the merchant to access the funds without transferring the funds from the account managed by the service provider 1212 to the bank account of the merchant 1216(A).

In at least one example, the service provider 1212 may provide inventory management services. That is, the service provider 1212 may provide inventory tracking and reporting. Inventory management services may enable the merchant 1216(A) to access and manage a database storing data associated with a quantity of each item that the merchant 1216(A) has available (i.e., an inventory). Furthermore, in at least one example, the service provider 1212 can provide catalog management services to enable the merchant 1216A to maintain a catalog, which can be a database storing data associated with items that the merchant 1216(A) has available for acquisition (i.e., catalog management services). In at least one example, the catalog may include a plurality of data items and a data item of the plurality of data items may represent an item that the merchant 1261(A) has available for acquisition.

In at least one example, the service provider 1212 can provide business banking services, which allow the merchant 1216(A) to track deposits (from payment processing and/or other sources of funds) into an account of the merchant 1216(A), payroll payments from the account (e.g., payments to employees of the merchant 1216(A)), payments to other merchants (e.g., business-to-business) directly from the account or from a linked debit card, withdrawals made via scheduled deposit and/or instant deposit, etc. Furthermore, the business banking services can enable the merchant 1216(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1216 to visualize their cash flow to track their financial health, set aside money for upcoming obligations (e.g., savings), organize money around goals, etc.

In at least one example, the service provider 1212 can provide financing services, such as via capital loans, consumer loans, and the like. In at least one example, the service provider 1212 can utilize one or more risk signals to determine whether to extend financing offers and/or terms associated with such financing offers.

In at least one example, the service provider 1212 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1212 can offer different types of capital loan products. For instance, in at least one example, the service provider 1212 can offer a daily repayment loan product, wherein a capital loan is repaid daily, for instance, from a portion of transactions processed by the payment processing service on behalf of the borrower. Additionally and/or alternatively, the service provider 1212 can offer a monthly repayment loan product, wherein a capital loan is repaid monthly, for instance, via a debit from a bank account linked to the payment processing service.

Additionally or alternatively, the service provider 1212 can provide financing services for offering and/or lending a loan to a borrower that is to be used for, in some instance, financing the borrower's consumer purchase (e.g., a consumer loan). In at least one example, a borrower can submit a request for a loan to enable the borrower to purchase an item from a merchant, which can be one of the merchants 1216. The service provider 1212 can generate the loan based at least in part on determining that the borrower purchased or intends to purchase the item from the merchant. The loan can be associated with a balance based on an actual purchase price of the item and the borrower can repay the loan overtime. In some examples, the borrower can repay the loan via installments, which can be paid via a stored balance associated with the service provider 1212.

The service provider 1212 can provide web-development services, which enable users 1214 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page).

Furthermore, the service provider 1212 can provide payroll services to enable employers to pay employees for work performed on behalf of employers. In at least one example, the service provider 1212 can receive data that includes time worked by an employee, sales made by the employee, gratuities received by the employee, and so forth. Based on such data, the service provider 1212 can make payroll payments to employee(s) on behalf of an employer via the payroll service. For instance, the service provider 1212 can facilitate the transfer of a total amount to be paid out for the payroll of an employee from the bank of the employer to the bank of the service provider 1212 to be used to make payroll payments. In at least one example, when the funds have been received at the bank of the service provider 1212, the service provider 1212 can pay the employee, such as by check or direct deposit, often a week or more after when the work was actually performed by the employee. In additional or alternative examples, the service provider 1212 can enable employee(s) to receive payments via same-day or instant deposit based at least in part on risk and/or reliability analyses performed by the service provider 1212.

Moreover, in at least one example, the service provider 1212 can provide employee management services for managing schedules of employees. Further, the service provider 1212 can provide appointment services for enabling users 1214 to set schedules for scheduling appointments and/or users 1214 to schedule appointments.

In some examples, the service provider 1212 can provide restaurant management services to enable users 1214 to make and/or manage reservations, to monitor front-of-house and/or back-of-house operations, and so on. In at least one example, the service provider 1212 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

In at least one example, the service provider 1212 can provide a peer-to-peer payment service that enables peer-to-peer payments between two or more users 1214. In at least one example, the service provider 1212 can communicate with instances of a payment application (or other access point) installed on devices 1206 configured for operation by users 1214. In an example, an instance of the payment application executing on a first device operated by a payor can send a request to the service provider 1212 to transfer an amount of funds from an account of the payor to an account of a payee (e.g., a peer-to-peer payment). The service provider 1212 can facilitate the transfer and can send a notification to an instance of the payment application executing on a second mobile device operated by the payee that the transfer is in process (or has been completed). In some examples, the service provider 1212 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 1214 may be a new to the service provider 1212 such that the user 1214 that has not registered with the service provider 1212. The service provider 1212 can offer onboarding services for registering a potential user 1214 with the service provider 1212. In some examples, onboarding can involve presenting various questions, prompts, and the like to a potential user 1214 to obtain information that can be used to generate a profile for the potential user 1214. Responsive to the potential user 1214 providing all necessary information, the potential user 1214 can be onboarded to the service provider 1212.

The service provider 1212 can be associated with IDV services, which can be used by the service provider 1212 for compliance purposes and/or can be offered as a service, for instance to third-party service providers (e.g., associated with the server computing device(s) 1210). That is, the service provider 1212 can offer IDV services to verify the identity of users 1214 seeking to use or using their services. Identity verification requires a customer (or potential customer) to provide information that is used by compliance departments to prove that the information is associated with an identity of a real person or entity. In at least one example, the service provider 1212 can perform services for determining whether identifying information provided by a user 1214 accurately identifies the customer (or potential customer) (i.e., Is the customer who they say they are?).

The service provider 1212 is capable of providing additional or alternative services and the services described above are offered as a sampling of services. In at least one example, the service provider 1212 can exchange data with the server computing device(s) 1210 associated with third-party service providers. Such third-party service providers can provide information that enables the service provider 1212 to provide services, such as those described above. In additional or alternative examples, such third-party service providers can access services of the service provider 1212. That is, in some examples, the third-party service providers can be subscribers, or otherwise access, services of the service provider 1212.

Figure 13:
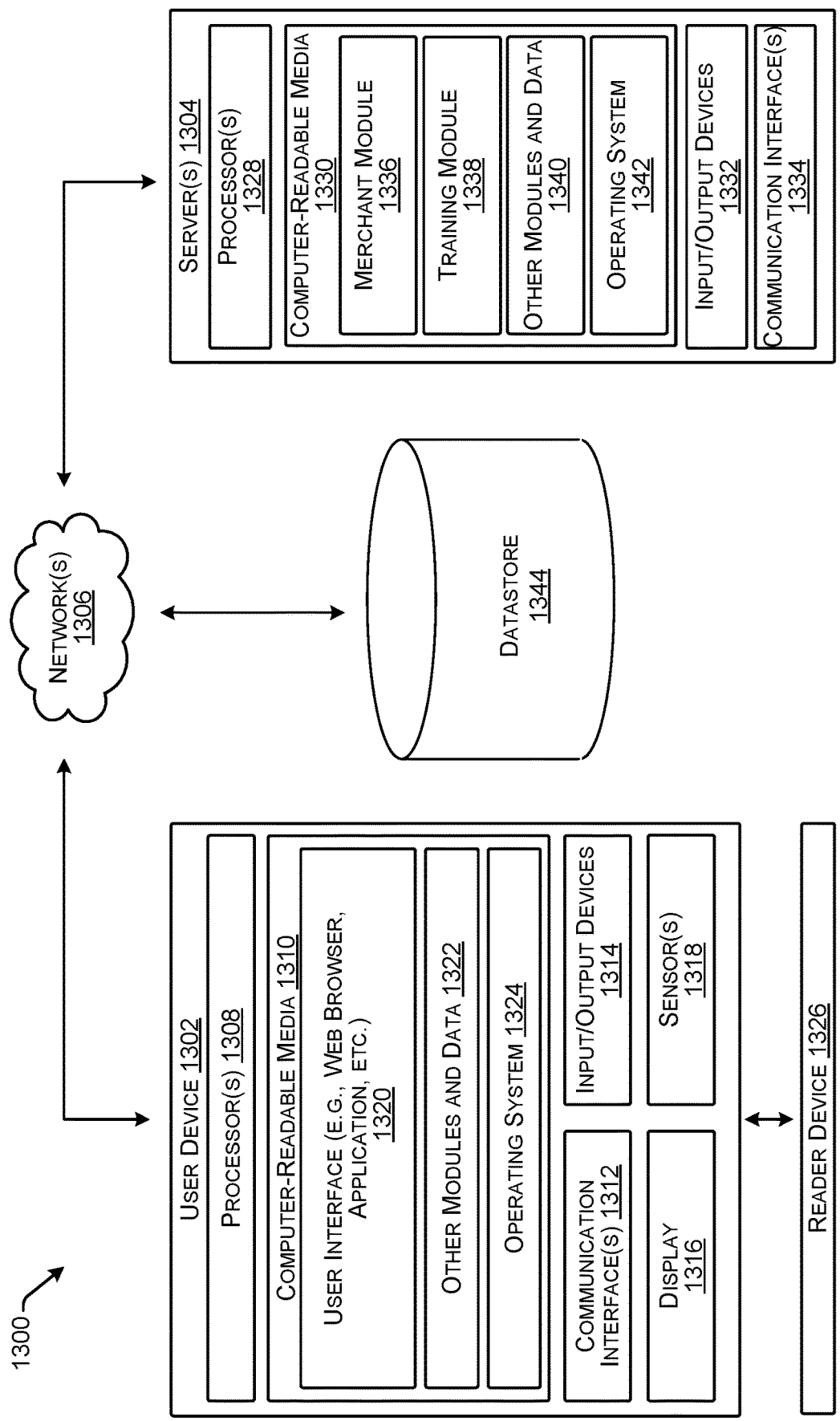
FIG. 13 illustrates additional details associated with individual components of the merchant ecosystem described above in FIG. 12.

FIG. 13 depicts an illustrative block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 12.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, modules or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or desktop application, which can be provided by a service provider 1212 associated with the server(s) 1304, or which can be an otherwise dedicated application. The IDV UI 108 is an example of the user interface 1320. Furthermore, a UI presented via the POS application 510 can additionally be associated with a user interface, such as the user interface 1320. In at least one example, a user can interact with the user interface via touch input, spoken input, or any other type of input.

Depending on the type of the user device 1302, the computer-readable media 1310 can also optionally include other functional components and data, such as other modules and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1302 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The user device 1302 can further include the one or more input/output (I/O) devices 1314. The I/O devices 1314 can include speakers, a microphone, a camera, and various user controls (e.g., buttons, a joystick, a keyboard, a keypad, etc.), a haptic output device, and so forth.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone/headphone port, a data port, or other suitable port. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader chip-side first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the payment service system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more modules and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one module for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 166, which may provide a clock signal indicating a time. Furthermore, the reader chip may perform functionality to control the network interface, which may interface with the network(s) 106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1326, and one or more communication interfaces 1324. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program modules, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 1212 and/or payment processing service. Functional components stored in the computer-readable media 1330 can optionally include a merchant module 1336, a training module 1338, and one or more other modules and data 1340.

The merchant module 1336 can be configured to receive transaction data from POS systems, such as the POS system 1224 described above with reference to FIG. 12. The merchant module 1336 can transmit requests (e.g., authorization, capture, etc.) to payment service server computing device(s) to facilitate POS transactions between merchants and customers. The merchant module 1336 can communicate the successes or failures of the POS transactions to the POS systems.

The training module 1338 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other modules and data 1340 can include the IDV module 110, the access module 136, and the payment processing module 502, the functionalities of which are described, at least partially, above. Further, the one or more other modules and data 1340 can include programs, drivers, etc., and the data used or generated by the functional components. Further, the server(s) 1304 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit to configure the computing device(s) described herein to execute instructions and to perform operations as described herein.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1302 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, etc.), audio speakers, connection ports and so forth.

In at least one example, the system 1300 can include a datastore 1342 that can be configured to store data that is accessible, manageable, and updatable. In some examples, the datastore 1344 can be integrated with the user device 1302 and/or the server(s) 1304. In other examples, as shown in FIG. 13, the datastore 1342 can be located remotely from the server(s) 1304 and can be accessible to the server(s) 1304. The datastore 1342 can comprise multiple databases.

In at least one example, the datastore 1342 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1212.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), customer service data, etc.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes.

The processes described herein can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method, implemented by a server computing device of an identity verification (IDV) system, the method comprising:
   training, by the server computing device and using first training data comprising first IDV data of a first cohort of users, a first machine-trained model to output an indication of one or more first IDV paths of a plurality of first IDV paths, wherein an individual first IDV path comprises a respective plurality of first factors associated with verifying identity, and wherein at least one of (i) first users of the first cohort share at least one first characteristic of a plurality of characteristics or (ii) the first users are associated with respective first similarity scores that satisfy a first similarity threshold;
   training, by the server computing device and using second training data comprising second IDV data of a second cohort of users, a second machine-trained model to output an indication of one or more second IDV paths of a plurality of second IDV paths, wherein an individual second IDV path comprises a respective plurality of second factors associated with verifying identity, and wherein at least one of (i) second users of the second cohort share at least one second characteristic of the plurality of characteristics or (ii) the second users are associated with respective second similarity scores that satisfy a second similarity threshold;
   receiving, by the server computing device and in association with a request to access a service, identifying information of a user;
   determining, by the server computing device and based at least in part on the identifying information, that the user is associated with the first cohort or the second cohort,
      wherein determining that the user is associated with the first cohort comprises determining that the user at least one of shares the at least one first characteristic with the first users of the first cohort or is associated with a first similarity score that satisfies the first similarity threshold, and
      wherein determining that the user is associated with the second cohort comprises determining that the user at least one of shares the at least one second characteristic with the second users of the second cohort or is associated with a second similarity score that satisfies the second similarity threshold;
   selecting, by the server computing device and based at least in part on the determined cohort, determining that the user is associated with the first cohort, one of the first machine-trained model or the second machine-trained model wherein the first cohort is associated with the first machine-trained model and the second cohort is associated with the second machine-trained model;
   based at least in part on selecting the first machine-trained model and at least in part on inputting the identifying information into the first machine-trained model, selecting, by the server computing device, a selected first IDV path from the selected first IDV path including first factors and another first IDV path of the plurality of first IDV paths including second factors different than the first factors, wherein the selected first IDV path and the another first IDV path are based at least in part on the service, wherein the first factors include verification by phone number, verification by bank account credentials, verification by legally identifying documents, or verification by payment card information;
   determining, by the server computing device, a score utilizing the first factors, in a sequence, in the selected first IDV path, wherein the score is indicative of a confidence that the identifying information provided by the user accurately identifies the user;
   comparing, by the server computing device, the score to a threshold for the service;
   determining, by the server computing device, terms associated with the service based at least in part on the score;
   granting, by the server computing device, the user access to the service with the associated terms based at least in part on the score satisfying the threshold; and
   updating, by the server computing device, the first machine-trained model using third training data comprising data associated with the user access.

2. The method as claim 1 recites, further comprising:
   causing presentation, by the server computing device, of an IDV user interface associated with at least one of the first factors; and
   receiving, by the server computing device and via the IDV user interface, input data associated with the at least one of the first factors.

3. The method as claim 2 recites, wherein the IDV user interface is presented on a display of a merchant point-of-sale (POS) device.

4. The method as claim 2 recites, wherein the IDV user interface is presented on a display of a customer device.

5. The method as claim 1 recites, wherein granting the user comprises granting the user access by associating an access indication with a user profile of the user that indicates that the user profile is permitted access.

6. A system comprising:
one or more processors; and
one or more computer-readable media that, when executed by the one or more processors, cause the one or more processors to perform actions comprising:
training, using first training data comprising first identity verification (IDV) data of a first cohort of users, a first machine-trained model to output an indication of one or more first IDV paths of a plurality of first IDV paths, wherein an individual first IDV path comprises a sequence of a plurality of first factors associated with verifying identity, wherein at least one of (i) first users of the first cohort share at least one first characteristic of a plurality of characteristics or (ii) the first users are associated with respective first similarity scores that satisfy a first similarity threshold;
training, using second training data comprising second IDV data of a second cohort of users, a second machine-trained model to output an indication of one or more second IDV paths of a plurality of second IDV paths, wherein an individual second IDV path comprises a sequence of a plurality of second factors associated with verifying identity, and wherein at least one of (i) second users of the second cohort share at least one second characteristic of the plurality of characteristics or (ii) the second users are associated with respective second similarity scores that satisfy a second similarity threshold;
receiving identifying information of a user in association with a request to access a service;
determining, based on the identifying information, that the user is associated with the first cohort or the second cohort,
wherein determining that the user is associated with the first cohort comprises determining that the user at least one of shares the at least one first characteristic with the first users of the first cohort or is associated with a first similarity score that satisfies the first similarity threshold, and
wherein determining that the user is associated with the second cohort comprises determining that the user at least one of shares the at least one second characteristic with the second users of the second cohort or is associated with a second similarity score that satisfies the second similarity threshold;
selecting, based at least in part on the determined cohort, determining that the user is associated with the first cohort, one of the first machine-trained model or the second machine-trained model, wherein the first cohort is associated with the first machine-trained model and the second cohort is associated with the second machine-trained model;
based at least in part on selecting the first machine-trained model and, based at least in part on inputting the identifying information into the first machine-trained model, a selected first IDV path including one or more first factors and another first IDV path including one or more second factors different than the one or more first factors, wherein the selected first IDV path is associated with verifying an identity of the user using the one or more first factors;
determining, based at least in part on the one or more first factors, a score utilizing the first factors in the sequence, wherein the score is indicative of a confidence that the identifying information provided by the user accurately identifies the user;
determining terms associated with the service based at least in part on the score;
granting, based at least in part on the score, the user access to the service with the associated terms based at least in part on the score satisfying a threshold; and
updating the first machine-trained model using third training data comprising data associated with the user access.

7. The system as claim 6 recites, wherein the one or more first factors include verification by phone number, verification by bank account credentials, verification by legally identifying documents, or verification by payment card information.

8. The system as claim 6 recites, further comprising determining another service to avail to the user based at least in part on the score.

9. The system as claim 6 recites, wherein the identifying information of the user is received from a subscriber of an IDV service and the actions further comprise sending the score to the subscriber, wherein the subscriber utilizes the score to determine access to the service.

10. The system as claim 6 recites, wherein granting the user access comprises granting the user access by associating an access indication with a user profile of the user that indicates that the user profile is permitted access.

11. The system as claim 6 recites, wherein:
the one or more first factors include verification by payment card information; and
the one or more second factors exclude verification by payment card information.

12. A method, implemented at least in part by a server computing device of a service provider, the method comprising:
training, by a server computing device of a service provider, using first training data comprising first IDV data of a first cohort of users, a first machine-trained model to output an indication of one or more first IDV paths of a plurality of first IDV paths, wherein an individual first IDV path comprises a plurality of first factors associated with verifying identity, and wherein at least one of (i) first users of the first cohort share at least one first characteristic of a plurality of characteristics or (ii) the first users are associated with respective first similarity scores that satisfy a first similarity threshold;
training, by the server computing device, using second training data comprising second IDV data of a second cohort of users, a second machine-trained model to output an indication of one or more second IDV paths of a plurality of second IDV paths, wherein an individual second IDV path comprises a respective plurality of second factors associated with verifying identity, and wherein at least one of (i) second users of the second cohort share at least one second characteristic of the plurality of characteristics or (ii) the second users are associated with respective second similarity scores that satisfy a second similarity threshold;
receiving, by the server computing device, identifying information of a user in association with a request to access a service;
determining, by the server computing device and based at least in part on the identifying information, that the user is associated with the first cohort or the second cohort,
wherein determining that the user is associated with the first cohort comprises determining that the user at least one of shares the at least one first characteristic with the first users of the first cohort or is associated with a first similarity score that satisfies the first similarity threshold, and wherein determining that the user is associated with the second cohort comprises determining that the user at least one of shares the at least one second characteristic with the second users of the second cohort or is associated with a second similarity score that satisfies the second similarity threshold;

selecting, by the server computing device and based at least in part on the determined cohort, determining that the user is associated with the first cohort, one of the first machine-trained model or the second machine-trained model, wherein the first cohort is associated with the first machine-trained model and the second cohort is associated with the second machine-trained model;

based at least in part on selecting the first machine-trained model and at least in part on inputting the identifying information to the first machine-trained model, selecting, by the server computing device, a selected first IDV path from the selected first IDV path including one or more first factors and another IDV path including one or more second factors different than the one or more first factors;

determining, by the server computing device and based at least in part on the one or more first factors, a score indicative of a confidence that the identifying information provided by the user accurately identifies the user;

determining, by the server computing device, terms associated with the service based at least in part on the score;

granting, by the server computing device and based at least in part on the score, the user access to the service with the associated terms based at least in part on the score satisfying a threshold; and updating, by the server computing device, the first machine-trained model using third training data comprising data associated with the user access.

13. The method as claim 12 recites, wherein the one or more first factors comprise one or more of verification by phone number, verification by bank account credentials, verification by legally identifying documents, or verification by payment card information.

14. The method as claim 12 recites, wherein the selected first IDV path comprises a process of determining the score using the one or more first factors.

15. The method as claim 12 recites, wherein:
the identifying information of the user is received from a subscriber of a verification service available via the service provider and the method further comprises sending the score to the subscriber; or
the identifying information of the user is received from a current user or a potential user of one or more services of the service provider.

16. The method as claim 12 recites, wherein the identifying information of the user is received from a current user or a potential user of one or more services of the service provider.

17. The method as claim 12 recites, wherein the service comprises a payment processing service or a peer-to-peer payment service.

18. The method as claim 12 recites, wherein the service comprises a same-day payroll deposit service.

19. The method as claim 12 recites, wherein the service comprises a consumer financing service.

20. The method as claim 12 recites, wherein the plurality of characteristics includes geolocation.

* * * * *